US008264458B2

(12) United States Patent
Cooper et al.

(10) Patent No.: US 8,264,458 B2
(45) Date of Patent: Sep. 11, 2012

(54) VARIABLE COMPLIANCE JOYSTICK WITH COMPENSATION ALGORITHMS

(75) Inventors: Rory A. Cooper, Gibsonia, PA (US); Donald Spaeth, Freeport, PA (US); Songfeng Guo, Pittsburgh, PA (US)

(73) Assignees: Dept. of Veterans Affairs, Washington, DC (US); The University of Pittsburgh of the Commonwealth System of Higher Education, Pittsburgh, PA (US)

( * ) Notice: Subject to any disclaimer, the term of this patent is extended or adjusted under 35 U.S.C. 154(b) by 860 days.

(21) Appl. No.: 12/353,248

(22) Filed: Jan. 13, 2009

(65) Prior Publication Data

US 2009/0153370 A1 Jun. 18, 2009

Related U.S. Application Data

(60) Division of application No. 11/068,655, filed on Feb. 25, 2005, now abandoned, and a continuation-in-part of application No. PCT/US03/27163, filed on Aug. 29, 2003.

(60) Provisional application No. 60/406,682, filed on Aug. 29, 2002.

(51) Int. Cl.
*G06F 3/033* (2006.01)
(52) U.S. Cl. ......... 345/161; 463/38; 700/85; 74/471 XY
(58) Field of Classification Search ..................... 700/85
See application file for complete search history.

(56) References Cited

U.S. PATENT DOCUMENTS

| 1,391,529 A | 9/1921 | Crochat |
| 3,100,547 A | 8/1963 | Rosenthal |
| 3,100,860 A | 8/1963 | Rosenthal |
| 3,784,746 A * | 1/1974 | Hess ................................. 381/1 |
| 3,814,199 A | 6/1974 | Jones |
| 4,078,627 A | 3/1978 | Brown et al. |

(Continued)

FOREIGN PATENT DOCUMENTS

GB 2 303 707 2/1997

(Continued)

OTHER PUBLICATIONS

Hopkins, Susanne, 1999. HomeCare. Power Points. Sep. 1, 1999. Web site: http://www.homecaremag.com/microsites/magazinearticle.asp?mode=print&magazinearticleid=11300&releaseid=&srid=111 50&magazineid=36&siteid=18.

(Continued)

*Primary Examiner* — Lixi C Simpson
(74) *Attorney, Agent, or Firm* — Dykema Gossett PLLC

(57) ABSTRACT

The present invention provides variable compliance joysticks with mechanical and software customization, and with an integrated control capability, and a method of systematically determining the best mechanical settings and compensatory algorithms to embed in the joysticks to offer an individual with substantial upper extremity motor impairments a personal fit and maximum function. The joysticks may include components for varying the compliance and dampening of the joystick shaft. The method may include providing the user access to operate the joysticks, operatively connecting the joysticks to a driving simulator, displaying an icon on the driving simulator, controlling movement of the icon by the joysticks, evaluating performance of the user based upon the user's ability to control movement of the icon, and modifying hardware settings and software algorithms for the joysticks based upon the evaluation.

20 Claims, 11 Drawing Sheets

U.S. PATENT DOCUMENTS

| | | | |
|---|---|---|---|
| 4,387,325 A | | 6/1983 | Klimo |
| 4,634,941 A | | 1/1987 | Klimo |
| 4,689,449 A | | 8/1987 | Rosen |
| 4,840,634 A | | 6/1989 | Muller et al. |
| 4,842,607 A | | 6/1989 | Repperger et al. |
| 4,849,583 A | | 7/1989 | Meyer |
| 5,033,000 A | | 7/1991 | Littlejohn et al. |
| 5,107,080 A | | 4/1992 | Rosen |
| 5,123,495 A | | 6/1992 | Littlejohn et al. |
| 5,202,773 A | | 4/1993 | Kato |
| 5,228,356 A | * | 7/1993 | Chuang ............... 74/471 XY |
| 5,231,998 A | | 8/1993 | Rosen et al. |
| 5,274,311 A | | 12/1993 | Littlejohn et al. |
| 5,278,557 A | | 1/1994 | Stokes et al. |
| 5,341,680 A | | 8/1994 | Smart et al. |
| 5,555,495 A | | 9/1996 | Bell et al. |
| 5,555,949 A | | 9/1996 | Stallard et al. |
| 5,607,158 A | * | 3/1997 | Chan ............... 273/148 B |
| 5,648,708 A | | 7/1997 | Littlejohn |
| 5,662,693 A | | 9/1997 | Johnson et al. |
| 5,675,359 A | * | 10/1997 | Anderson ............... 345/161 |
| 5,726,541 A | | 3/1998 | Glenn et al. |
| 5,732,786 A | * | 3/1998 | Fujigaki ............... 180/19.3 |
| 5,889,507 A | | 3/1999 | Engle et al. |
| 5,912,659 A | | 6/1999 | Rutledg et al. |
| 5,961,561 A | * | 10/1999 | Wakefield, II ............... 701/29 |
| 6,201,196 B1 | * | 3/2001 | Wergen ............... 200/6 A |
| 6,202,773 B1 | | 3/2001 | Richey, II et al. |
| 6,222,524 B1 | | 4/2001 | Salem et al. |
| 6,225,977 B1 | | 5/2001 | Li |
| 6,227,066 B1 | * | 5/2001 | Stachniak ............... 74/471 XY |
| 6,693,625 B2 | * | 2/2004 | Armstrong ............... 345/161 |
| 2002/0019686 A1 | * | 2/2002 | Ulrich et al. ............... 701/1 |
| 2002/0053849 A1 | | 5/2002 | Corcoran |
| 2002/0075234 A1 | | 6/2002 | Poole |

FOREIGN PATENT DOCUMENTS

| | | |
|---|---|---|
| NL | 8004928 | 8/1980 |
| WO | 00/32434 | 6/2000 |
| WO | 01/65329 | 9/2001 |
| WO | 02/37252 | 5/2002 |

OTHER PUBLICATIONS

Hoveround.Undated. Pricing, Medicare and Providers. Corporate web Site: http://www.hoveround.com.

KPMG/University of Illinois. 2001. Cases in Strategic-Systems Auditing. Virtual Control Corporation (VCC). Auditor/Client Negotiations. May 2001. Web site: http://www.cba.uiuc.edu/kpmg-uiuc-cases/cases/vcc/VCCcase.pdf.

Lange, Michelle. .2001. Criteria to Determine the Appropriateness of a Power Wheelchair. Rehab Central.com. Apr. 13, 2001. Web site: http://www.rehabcentral.com/art-adee.cfm?artID=9062.

Multiple Sclerosis Foundation. 2002. Frequently Asked Questions. Web site: http://www.msfacts.org/faqs.htm.

Park, Richard. 2000. HomeCare. Tapping Into New Markets. Feb. 1, 2000. Web site: http://www.homecaremag.com/ar/medical_tapping_new_markets/.

Smith, Mark. 2000. Show Me the Money! A Wheelchair Junkie's Guide to Funding. WheelchairJunkie.com. Web site: http://www.wheelchairjunkie.com/funding.html.

Spinal Cord Injury Information Network. 2001. Facts and Figures at a Glance, May 2001. Web site: http://www.spinalcord.uab.edu/show.asp?durki=21446.

U.S. Census Bureau. 1997. Americans with Disabilities: 1997—Table A. Web site: http://landview.census.gov/hhes/www/disable/sipp/disab97/ds97ta.html.

* cited by examiner

VARIABLE COMPLIANCE JOYSTICK WITH COMPENSATION ALGORITHMS

RELATED APPLICATIONS

This application is a Divisional of U.S. application Ser. No. 11/068,655, filed Feb. 25, 2005 now abandoned and claims benefit of priority of Provisional Application Ser. No. 60/406,682, filed Aug. 29, 2002, and is a continuation-in-part of PCT App. Serial No. PCT/US03/27163, filed Aug. 29, 2003.

BACKGROUND OF INVENTION a. Field of Invention

The invention relates generally to electric powered wheelchairs, and, more particularly to an apparatus and method for customized control of an electric powered wheelchair.

b. Description of Related Art

Position sensing devices are integral components of computing systems, the ubiquitous "mouse" being one of the best examples. Joysticks are also common, and find applications in computer games, medical devices, wheelchairs, robotics, aircraft, advanced vehicles, and other devices. Other examples of position sensing devices include trackballs and virtual reality equipment such as helmets, goggles, gloves, and foot pedals. The earliest joysticks were basically a simple arrangement of contact switches at four quadrants. Moving the joystick shaft away from its centered position closed one of the four switches, depending on the direction of movement. Springs connected to the joystick returned the device to a central position when the joystick was released. The resistance to motion, called compliance, that is provided by the springs could be provided or augmented by other means, such as having the joystick move through a viscous fluid.

An improvement to the contact switch joystick was made by development of the position sensing joystick. In this arrangement, the joystick was coupled to two potentiometers mounted at right angles. Motion of the joystick produced voltages from the potentiometers that indicated the position of the joystick. Later variations of position sensing joysticks employed optical encoders to determine the joystick position, replacing potentiometers. Further refinements of position sensing joysticks included the addition of tactile and force feedback. Tactile feedback is a simple vibration generated when provided position information falls within some desired region. Force feedback devices actually apply forces to the joystick shaft, for example, pushing against the operator induced motion. Force feedback may be used to indicate to a robotic operator that contact with an object has been made. The force sensing, or isometric, joystick used strain gauges to measure forces applied to the joystick with no motion of the joystick required. An example of such a joystick is the miniature isometric joystick used on laptop computer keyboards.

In view of the aforementioned developments, today's electric powered wheelchairs include several components for facilitating control of movement thereof, including proportional position sensing joysticks, electric powered wheelchair controllers, isometric joysticks, damped joystick controls, joysticks with corrective algorithms and integrated control features, and wheelchair driving simulators.

Proportional position sensing joysticks for electric powered wheelchairs are known in the art and generally allow individuals with impaired mobility to drive such wheelchairs. Position sensing joysticks produce speed and direction signals proportional to the joystick's directionality and angle of deflection. It has been shown that such joysticks are inadequate for as many as 40% of potential wheelchair users, partly because they are built on a "one size fits all" philosophy. For example, current clinical practice is to have a user try out various commercially available position sensing joystick controls, and then select a handle and mounting position most compatible with the user's residual hand function. Frequently, none of the commercial position sensing joystick controls are suitable and the user is often downgraded to single switch head arrays rather than a proportional control system. While single switch technology can be operated with limited and imprecise limb movement, the result is generally a slow and awkward wheelchair control system.

With regard to electric powered wheelchair controllers, such controllers generally include a power regulating circuit between the position sensing joystick and the wheelchair drive motors. Controllers translate the speed and direction signals from the user control (i.e. a joystick) into appropriate current levels that are applied to the drive motors of a wheelchair. Over the years, the improvement and perfection of such controllers has been a focus of the wheelchair industry. Early controllers generally included simple driving algorithms, an example of which includes a controller operated by a driver pushing a position sensing joystick to the right or left, at which time the controller decided whether to merely slow the wheel inside the turn or, in the event of a sharp, low speed turn, to run the inside wheel in reverse to produce a tighter turning circle. In more modern controllers, in order to safely match an electric powered wheelchair to different driving abilities of particular users, manufacturers provide several adjustments on their controllers that a vendor or clinician may set with a hand held programmer. An exemplary adjustment may include adjustment of the maximum velocity the wheelchair will achieve during straight ahead or turning maneuvers. Modern controllers also include advanced algorithms to stabilize a wheelchair in hazardous terrain, such as during climbing or descending steep grades, or when traversing a cross slope. Even in light of the aforementioned improvements in controllers, commercial controllers and position sensing joysticks are generally unable to recognize or in any way correct for an operator's unintentional hand movements. Another major disadvantage of currently available controllers is that they only serve the electric powered wheelchair, and do not support the control of any other associated device, such as personal computers or environmental control systems.

With regard to isometric joysticks, as discussed above, such joysticks are generally used with personal computers. A well-known example of an isometric joystick includes the "eraser head" mouse used on many laptop computers. While such joysticks are known in the industry, these joysticks have had limited application in the field of electric powered wheelchairs due to the associated limitations in the ability of user to adequately operate the joystick.

With regard to damped joystick control, while such a control methodology is known in the industry, damped control for joysticks has generally been used in the reduction of hand tremor. Moreover, the damped control methodology has primarily been used for position sensing, and not for control of electric powered wheelchairs.

Lastly, with regard to wheelchair driving simulators, while simulators have indeed found applications in the automotive field, as with automobile driving simulators, for example, such simulators are however not applicable to wheelchair driving. Moreover, no known driving simulators have been used to tune electric powered wheelchairs or associated joysticks.

Accordingly, there remains a need for a customizable and versatile control technology for electric powered wheelchairs. There also remains a need for a variable compliance joystick for electric powered wheelchair control and for facilitating the customization of the aforementioned technologies for users with various disabilities.

SUMMARY OF INVENTION

The invention solves the problems and overcomes the drawbacks and deficiencies of the prior art wheelchair control and simulation systems by providing an apparatus and method for customized control of electric powered wheelchairs.

Thus an exemplary aspect of the present invention is to provide variable compliance joysticks with mechanical and software customization, and with an integrated control capability.

Another aspect of the present invention is to provide a method of systematically determining the best mechanical settings and compensatory algorithms to embed in the joystick to offer an individual with substantial upper extremity motor impairments a personal fit and maximum function.

Yet another aspect of the present invention is to provide customized joysticks that can be closely matched to user needs by use of a simulator to optimize software and hardware characteristics of the joystick.

The present invention achieves the aforementioned exemplary aspects by providing first and second embodiments of a joystick apparatus. The first embodiment of the joystick apparatus according to the present invention includes a rigid shaft having a tip, and a flexible extension operatively connected to the shaft to vary the compliance of the shaft. The extension may be hollow and encircle the shaft, and may further include a frusto-conical cross-section. The extension may include a viscous substance disposed therein for dampening motion of the shaft. The shaft may include upper and lower shaft segments, the segments including a resilient member disposed between adjacent ends thereof and being adjustable to be spaced away from each other for varying the compliance of the shaft. The joystick may include integrated control capability for operating multiple assistive devices, and may be operatively mounted on an electric powered wheelchair for allowing a user to operate multiple assistive devices.

The joystick may further include compensation algorithms including an elliptical dead-zone representative of the joystick shaft at rest, the dead-zone representing a minimum range of forces which must be exceeded to produce motion of an electric powered wheelchair including the joystick mounted thereon, the dead-zone further representing a maximum range of forces which must not be exceeded to prevent movement of the wheelchair. The compensation algorithms may include a determination of an optimal bias axes gain for movement of the joystick shaft in left, right, forward and backward directions. The compensation algorithms may also include at least one software template for at least one of controlling bias of the joystick shaft, decreasing throw of the joystick shaft and reducing degrees of freedom of an output signal of the joystick shaft. The software template may be based upon the mathematics of super quadratics, and may be one of a square, circular, cross, elliptical and diamond shaped template. The compensation algorithms may also include filtering to reduce the effects of unwanted motions of the joystick shaft.

The second embodiment of the joystick apparatus according to the present invention includes a joystick shaft having a generally predetermined length, and including upper and lower joystick segments operatively connected to each other. The lower joystick segment may be substantially flexible and movable relative to the upper joystick segment to vary compliance of the joystick shaft without substantially changing the predetermined length.

For the second embodiment of the joystick apparatus described above, the upper joystick segment may include a longitudinal axis. The joystick may further include a gimbal assembly substantially surrounding a length of the lower joystick segment for generally maintaining the lower joystick segment in a predetermined extended orientation relative to the longitudinal axis. The upper joystick segment may include a handle mounted to an index bushing including internal threads along a length thereof. A drive stud may be operatively connected to the lower joystick segment and further include external threads operatively engaged with the internal threads such that rotation of the handle in first and second opposite rotational directions respectively moves the lower joystick segment toward and away from the upper joystick segment to vary the compliance of the shaft. The joystick apparatus may further include a spring biased locking plunger selectively engageable with the index bushing for allowing and preventing rotation of the index bushing when respectively disengaged from and engaged with the index bushing.

Alternatively, for the second embodiment of the joystick apparatus, the upper joystick segment may include a handle mounted to an index bushing including external threads along a length thereof. A chamber column including internal threads may be operatively engaged with the external threads such that rotation of the handle in first and second opposite rotational directions respectively moves the chamber column away from and toward the upper joystick segment to vary the compliance of the shaft by reducing a bendable length of the lower joystick segment.

Alternatively, in combination, the upper joystick segment may include a handle mounted to an index bushing including internal and external threads along a length thereof. A drive stud may be operatively connected to the lower joystick segment and further include external threads operatively engaged with the index bushing internal threads. A chamber column including internal threads may be operatively engaged with the index bushing external threads, such that rotation of the handle in first and second opposite rotational directions respectively moves the lower joystick segment toward and away from the upper joystick segment, and further respectively moves the chamber column away from and toward the upper joystick segment to vary the compliance of the shaft by reducing a bendable length of the lower joystick segment.

For the joystick described above, the gimbal assembly may include a gimbal ring operatively connected to the upper joystick segment. The gimbal ring may have the lower joystick segment disposed therethrough. The gimbal assembly may further be disposed within an enclosure for limiting pivotal movement of the joystick shaft by substantially enclosing the upper joystick segment within an opening in the enclosure. The gimbal ring may be pivotally mounted within the enclosure for pivotal movement about a first axis of rotation. The upper joystick segment may be pivotally mounted to the gimbal ring by at least two yoke legs for rotation about a second axis of rotation substantially orthogonal to the first axis of rotation for thereby enabling substantially universal pivotal movement of the upper joystick segment relative to the lower joystick segment. The lower joystick segment may be slidably connected to an isometric post, for controlling the joystick, by a sleeve fixedly mounted to the lower joystick segment and further slidably disposed around the isometric post.

As discussed above for the first embodiment, the second embodiment of the joystick apparatus may likewise include a joystick having integrated control capability for operating multiple assistive devices, and the joystick may be operatively mounted on an electric powered wheelchair for allowing a user to operate multiple assistive devices. The joystick may further include compensation algorithms including an elliptical dead-zone representative of the joystick shaft at rest, the dead-zone representing a minimum range of forces which must be exceeded to produce motion of an electric powered wheelchair including the joystick mounted thereon, the dead-zone further representing a maximum range of forces which must not be exceeded to prevent movement of the wheelchair. The compensation algorithms may include a determination of an optimal bias axes gain for movement of the joystick shaft in left, right, forward and backward directions. The compensation algorithms may also include at least one software template for at least one of controlling bias of the joystick shaft, decreasing throw of the joystick shaft and reducing degrees of freedom of an output signal of the joystick shaft. The software template may be based upon the mathematics of super quadratics, and may be one of a square, circular, cross, elliptical and diamond shaped template. The compensation algorithms may also include filtering to reduce the effects of unwanted motions of the joystick shaft. The upper joystick segment may be detachable from the lower joystick segment for facilitating replacement of the lower joystick segment.

The invention yet further provides a method for systematically determining the best mechanical settings and compensatory algorithms to embed in a joystick to offer a user a personal fit and maximum function. The method includes providing the user access to operate the joystick, operatively connecting the joystick to a driving simulator, displaying an icon on the driving simulator, controlling movement of the icon by the joystick, evaluating performance of the user based upon the user's ability to control movement of the icon, and modifying hardware settings and software algorithms for the joystick based upon the evaluation.

For the method described above, modifying hardware settings may include substituting different flexible extensions for varying compliance of a joystick shaft, the extensions being operatively connected to the shaft to encircle the shaft, the extensions further including a frusto-conical cross-section. Modifying the software algorithms may include computing an elliptical dead-zone representative of a joystick shaft at rest, the dead-zone representing a minimum range of forces which must be exceeded to produce motion of an electric powered wheelchair including the joystick mounted thereon, the dead-zone further representing a maximum range of forces which must not be exceeded to prevent movement of the wheelchair. Modifying the software algorithms may include determining an optimal bias axes gain for movement of a joystick shaft in left, right, forward and backward directions. Modifying the software algorithms may include providing at least one software template for at least one of controlling bias of a joystick shaft, decreasing throw of the joystick shaft and reducing degrees of freedom of an output signal of the joystick shaft. The software template may be based upon the mathematics of super quadratics, and may be one of a square, circular, cross, elliptical and diamond shaped template. Modifying at least one of the hardware settings and software algorithms may include obtaining a plurality of joystick shaft inputs corresponding to driving performance of an electric powered wheelchair having the joystick mounted thereon.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
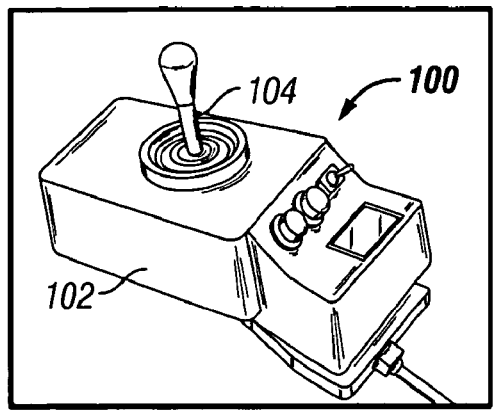
FIG. 1 is an illustration of a first embodiment of a variable compliance joystick according to the present invention.

Referring now to the drawings wherein like reference numerals designate corresponding parts throughout the several views, FIGS. 1-14 illustrate components and features of a first embodiment of variable compliance joystick 100 and associated systems according to the present invention, and FIGS. 15-18 illustrate components and features of a second embodiment of variable compliance joystick 200 according to the present invention.

The first embodiment of variable compliance joystick 100 will now be described in detail.

Specifically, as illustrated in FIGS. 1-14, the present invention provides a variable compliance joystick 100 with mechanical and software customization, and with an integrated control capability, and a method of systematically determining the best mechanical settings and compensatory algorithms to embed in joystick 100 to offer an individual with substantial upper extremity motor impairments a personal fit and maximum function. Generally, variable compliance joystick 100 may be used for driving Electric Powered Wheelchairs, for controlling additional rehabilitation technology, and for other related operations as discussed in detail below.

The aforementioned features of variable compliance joystick 100 and the method of systematically determining the best mechanical settings and compensatory algorithms to embed in joystick 100 will first be broadly described.

With regard to mechanical customization, as discussed in greater detail below, variable compliance joystick 100 may generally be an isometric (force sensing) joystick, and contain an internal micro controller and memory. Joystick 100 may be operable in full isometric mode (no shaft movement), or alternatively, a flexible extension (i.e. a conical elastimer sheathe) may be added to the joystick shaft to create various levels of compliance (motion with spring return). If the flexible extension is hollow and filled with a viscous substance such as stiff modeling clay, a dampening effect may be included as well.

With regard to software customization, as discussed in greater detail below, variable compliance joystick 100 may generally include a reprogrammable internal micro controller for intercepting and modifying the transducer signals generated by the joystick shaft. These transformations will hereinafter be referred to as "compensatory algorithms".

With regard to integrated control capability, as discussed in greater detail below, variable compliance joystick 100 may generally have the ability to operate a personal computer by functioning as a cordless joystick mouse. For example, most current wheelchair joysticks only drive the wheelchair, and separate interfaces must be purchased and mounted if an individual wishes to operate other devices such as a personal computer. Moreover, individuals with impaired hand use may only be able to reach and operate a single control interface, thus forcing them to obtain assistance when changing between devices. Therefore, by providing joystick 100 with the ability to operate a personal computer, in addition to wheelchair driving and computer access, joystick 100 may also be used to access devices such as voice output communication aids, environmental control systems etc.

Lastly, with regard to the method of systematically determining the best mechanical settings and compensatory algorithms to embed in joystick 100 to offer an individual with substantial upper extremity motor impairments a personal fit and maximum function, as discussed in greater detail below, variable compliance joystick 100 may include a Wheelchair-Driving Simulator for determining the best joystick settings. For example, current clinical practice for setting up an Electric Powered Wheelchair joystick is to mechanically mount the joystick on the side of the chair within the user's reach and then have the user practice driving around the clinic floor space. Based solely upon visual observation, the clinician makes changes to the wheelchair controller settings to improve wheelchair manageability. The Wheelchair-Driving Simulator for determining the best joystick settings may generally consist of a stationary wheelchair positioned in front of a large screen computer monitor. While practicing with joystick 100, the user may "drive" an onscreen wheelchair icon or "sprite" through a series of close-quarter maneuvers. The simulator program running on a desktop PC may monitor the sprite's path and score the driver's maneuvering skill. During the evaluation phase, both the hardware settings and software algorithms of the joystick 100 may be modified to improve the client's driving ability. Hardware compliance and dampening adjustments may be achieved by substituting different extension shafts on joystick 100. Compensatory algorithms may be invoked by selecting options contained on menus in the driving simulator program. In this manner, a therapist may rapidly try out a variety of mechanical and algorithm settings. The simulator may immediately stage a fresh sprite-driving task and objectively score the benefit of a particular mechanical setting or algorithm. Through this iterative process, the therapist may "fine tune" joystick 100 to the user's motor pattern. When the most useful customizations have been determined, the final extension shaft may remain with the joystick and the final compensatory algorithms may be cross-compiled and downloaded into the joystick's internal micro controller memory, thus providing a user with a personalized joystick.

Variable compliance joystick 100 and the method for systematically determining the best mechanical settings and compensatory algorithms to embed in joystick 100, will now be described in detail in reference to FIGS. 1-14.

Figure 2:
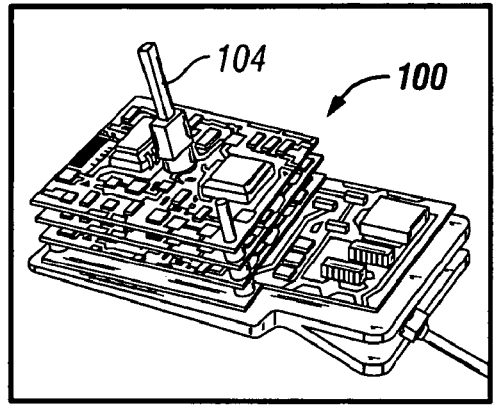
FIG. 2 is an illustration of the variable compliance joystick of FIG. 1, with the outer housing removed to show the internal components.

Specifically, as shown in FIGS. 1 and 2, variable compliance joystick 100 may be designed such that it would appear similar to a conventional joystick and use commercial mounting and positioning hardware for an electric powered wheelchair. Joystick 100 may be used in full isometric mode or in a variable compliance mode, and include a housing 102 having a shaft 104 including a joystick tip 106 disposed on a top end thereof for operation by a user's fingertip. Shaft 104 may couple joystick tip 106 to an actuator plate fixed to a lower end of the shaft. The actuator plate may include horizontal arms extending radially from shaft 104, with the number of arms generally equaling the number of discrete force sensors (not shown), with each arm overlying a corresponding sensor.

Joystick 100 may produce a voltage output proportional to the force exerted on shaft 104 by a user, and include printed circuit board 154 designed to fit within housing 102 for providing voltage regulation, bridging direct current excitation, bridging output signal amplification and low-pass filtering of the strain gage bridge signal. Joystick 100 may be operatively connected to an electric powered wheelchair 110. As with conventional electric powered wheelchairs, wheelchair 110 may operate on a 24 V dc system and use electromechanical parking brakes (not shown) that are normally closed (i.e. fully active) that release when power is applied to the motors. In the embodiment of FIG. 1, joystick 100 may obtain its power from batteries (not shown) and run on 12 V dc, or half the bus voltage. The output signal may include level shifting in order to be compatible with commercial analog electric powered wheelchair controllers. Alternatively, for digital electric powered wheelchair controllers, joystick 100 may include a serial or parallel port. Joystick 100 may contain an internal microcontroller with memory which uses compensatory algorithms to modify signals generated by the joystick forces on each strain gauge.

In operation, a forward directed force on shaft 104 produces a forward motion of wheelchair 110 with speed proportional to the magnitude of the force. Likewise, a rearward directed force on shaft 104 produces a rearward motion of wheelchair 110 with speed proportional to the magnitude of the force. Left and right forces on shaft 104 are used to turn wheelchair 110 in the direction of the applied force with the rate of turning being proportional to the magnitude of the force. A digital low-pass filter with a cut-off frequency of 6 Hz, for example, may be implemented as the default setting to reduce the effects of vibration and tremor. Joystick 100 may be designed for electric powered wheelchairs that use differential wheel speed to provide directional control. In such wheelchairs, front casters 112 may swivel as wheelchair 110 turns in response to changes in the speed of rear wheels 114.

As discussed above, joystick 100 may generally include variable compliance and dampening which can be modified to enhance operator control. Variable compliance, which refers to the movement ease and springiness of shaft 104, generally refers to the spectrum of force versus motion. For example, standard position-sensing joysticks produce output signals proportional to shaft directionality and angle of deflection. These joysticks move freely as no significant spring tension (other than a return spring) is supplied. Examples of common controls that sense position are computer trackballs, sliding volume controls on stereos and doorknobs, all of which are essentially movement driven. A separate set of control technologies exist that respond to force with little or no displacement. As discussed above, these devices are collectively called isometric controls, one of which is the common "eraser head" mouse, which appears in the center of the keyboard on many laptop computers. Another example is the membrane keypad used on microwave ovens to simplify cleaning, in which traditional push buttons are replaced with sealed force-sensing switches. What is not obvious is that position sensing and force-sensing controls merely represent the endpoints of a continuum of control designs. Thus the term variable compliance is used when referring to this spectrum of force vs. motion. For example, mid compliance controls are not common in the home, but are frequently found on motor vehicles. Examples of mid compliance controls include the brake and accelerator pedals on automobiles, or the control stick on an aircraft. Mid range compliance is designed into these controls to provide proprioceptive feedback (tactile sensation through pressure). This is especially important in situations where the operator must visually scan the surroundings and cannot observe the position of the control.

Figure 3A:
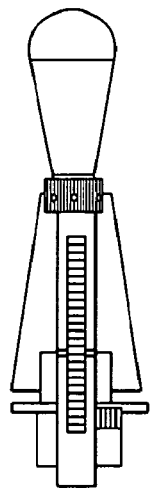
FIGS. 3A-3D are enlarged views of the compliance and dampening components for the variable compliance joystick of FIG. 1.
Figure 3B:
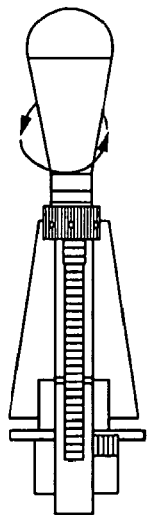

The variable compliance mode for joystick 100 allows motion of shaft 104 with mechanical resistance and spring return to restore shaft 104 to a central position when the operating force is removed. As shown in FIGS. 3A-3D, compliance may be achieved by adding a flexible extension 136 to joystick shaft 104. Compliance provides tactile feedback which gives the operator an indication of joystick position, freeing the use of vision for maneuvering wheelchair 110. While conventional movement sensing and isometric joysticks are actually endpoints of a spectrum, such joysticks contain a continuum of movement/force ratios ranging from low compliance, (high force with very little movement), to high compliance, (low force with substantial movement). Accordingly, variable compliance joystick 100 may include shaft 104 including upper and lower shaft segments 130, 131, respectively, joined by a closed coil spring 132. The upper shaft segment 130 may be drilled and threaded to match the spring wire gage. Therefore, by turning handle 134 counterclockwise, progressively more of spring 132 may be exposed to increase the compliance. For example, as shown in FIG. 3A, in the full isometric setting, the ends of the two shaft segments 130, 131 are in contact and fully constrained by the backing flange, thus the spring having no effect. To select a mid range compliance, as shown in FIG. 3B, the upper shaft segment 130 may be turned several revolutions, thus allowing spring 132 to buckle under load for increasing the amount of movement associated with a given force. Lastly, for the high compliance setting shown in FIG. 3C, additional spring length may been exposed by further turning handle 134 to allow upper shaft 130 to buckle relative to lower shaft segment 131. It should be noted that shaft 104 becomes longer as compliance is increased. This increase in length can be compensated by machining a long threaded hole (not shown) inside handle 134 and counter rotating the handle to correct for the length increase.

Dampening refers to the introduction of friction, which varies with the velocity of shaft 104. Dampening provides an additional mechanical modification that may improve proportional control, especially for individuals with athetoid cerebral palsy. For example, an athetoid movement disorder is characterized by incessant, uncontrolled writhing motions, frequently accompanied by involuntary, explosive bursts of extreme muscular exertion. Accordingly, if an individual with athetosis attempts to operate a conventional proportional joystick, he will uncontrollably slam the stick hard against the stop ring. A damper, as shown in FIG. 3D, is a frictional device in which the coefficient of friction increases with the velocity of the joystick. If a tremor or athetoid movement is characterized by a higher frequency than volitional movement, a damper will tend to attenuate the unwanted movement while preserving the volitional movement, thus providing a means of increasing the signal to noise ratio. Dampening may be accomplished with pneumatics, viscous fluids, electrorheological fluids, or by electric particle brakes.

In the embodiment of FIG. 3D, flexible extension 136 (i.e. an elastimer sheathe) disposed around shaft 104 may be provided to act as a variable damper. Flexible extension 136 may provide both compliance and dampening for movement of shaft 104. For example, in the mid range compliance region for FIG. 3B, the cross section of extension 136 may be relatively thick and provide the heavier dampening required for the higher spring tension. Variable compliance joystick 100 may further include an elastimer backing flange 138, a clearance hole 140 and a tapered locking base 142. An enclosure 144 may be used to encase the various components of joystick 100. Joystick 100 may further include the following components, including an interface block 146 to mounting tube 148, an anchor plate 150 for joystick shaft 104, a cable 152 connectable to a power wheelchair controller (not shown), a printed circuit board 154 for strain gages, user status LCD panel 158, joystick power switch (push on-push off) 162, controller interface and user controls printed circuit board 166, an analog signal conditioning printed circuit board 168, a digital signal processing printed circuit board 170 and a computer mouse interface printed circuit board 172. Alternatively, additional dampening may be achieved by filling extension 136 with a viscous substance (such as stiff modeling clay) for providing mechanical dampening of motion.

Figure 3C:
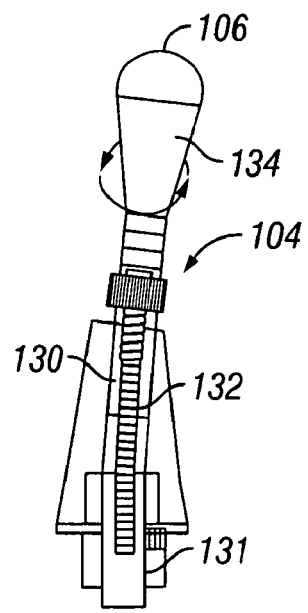
Figure 3D:
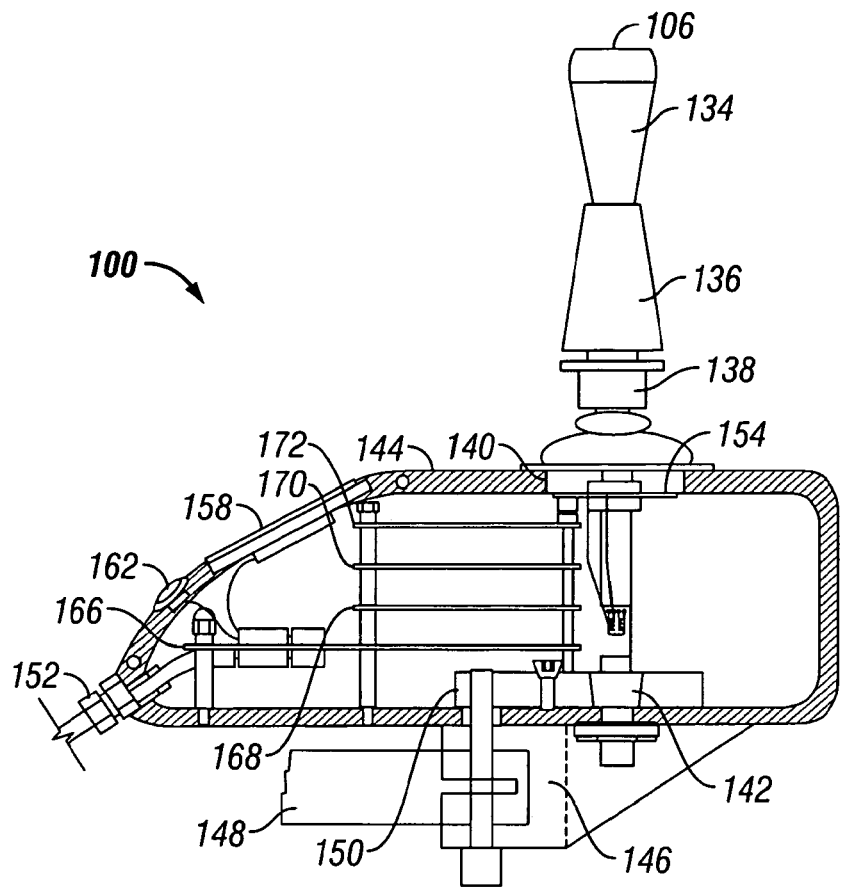

In operation, as handle 134 is turned counterclockwise toward higher compliances (movement sensing region), as shown in FIG. 3C, the spring tension decreases. At this stage, the thinner region of flexible extension 136 is engaged and less dampening is imposed on shaft 104.

As shown in FIG. 3C, a scale similar to a micrometer thimble may be affixed above flexible extension 136. Upper shaft 130 may be engraved with ring rulings and a single longitudinal line (not shown) to allow reading and replicating compliance settings. By combining this physically adjustable compliance with the different gain and filter settings discussed below, a variety of unique joystick characteristics may be created.

The method of systematically determining the optimal settings for variable compliance joystick 100 by means of a wheelchair driving simulator will next be described in detail in reference to FIGS. 4-14. The wheelchair driving simulator illustrated in FIG. 9, may be used to evaluate the operational characteristics of a user and to adjust software and mechanical parameters of joystick 100 to determine the optimal driving configuration. As discussed in greater detail below, the simulator may use a computer generated rendition of a wheelchair course displayed on a large-screen computer monitor and a stationary wheelchair placed before the monitor. The wheelchair may be fitted with a joystick, but instead of the joystick controlling motion of the wheelchair, the joystick may control the motion of a wheelchair icon on the monitor. The user may guide the wheelchair icon through a series of close-quarter maneuvers. The program may have the ability to load various compensatory algorithms and driving tasks. The therapist running the simulation may add compliance and dampening to the test by attaching different extension shafts to joystick 100. The simulator may score each driving task, enabling the therapist to determine the optimal mechanical and software configuration for the user. The compensation algorithms may include dead-zone computation joystick at rest). This section includes low-pass filtering to reduce effects of tremor-like motion. The compensation algorithms may further include a determination of optimal bias axes (i.e. left-right, forward-backward), gain for each axis, determining wheelchair speed in each direction, and software templates (i.e. mathematically generated, to control bias, complex shapes generated by changing a single parameter).

Software compensation algorithms may be applied to the signals emanating from the joystick transducers. These can be either an alternative or an addition to the aforementioned mechanical variable compliance or dampening intervention techniques discussed previously.

The three phases (i.e. Phase One, Phase Two and Phase Three) for the optimization of variable compliance joystick 100 will now be described.

Generally, for Phase One, because the fitting of joystick 100 is carried out in a virtual setting, an empirical kinematics database (EKD) of the user's current or "to be prescribed" electric powered wheelchair is preferably obtained and loaded onto the virtual driving system. An EKD characterizes the movement behavior of an electric powered wheelchair as various joystick signals are applied. This data is needed so that the virtual wheelchair image on the simulator can be made to accelerate, decelerate and turn in the same manner as the actual vehicle. For Phase Two, a virtual driving simulator may be used to train the user to effectively control the electric powered wheelchair through an iterative process. The user may be observed driving the virtual wheelchair while performing virtual tasks and the physical (compliance and dampening) and algorithmic (software compensation) parameters of the joystick may be adjusted to maximize the user's driving capability. For Phase Three, the final control parameters chosen during simulation may be embedded into joystick 100 mounted on an actual electric powered wheelchair. The user may be observed driving the physical wheelchair in a wheelchair activities driving laboratory to confirm that the parameters chosen carry over to real world driving.

Specifically, for Phase One, a control fitting evaluation may be conducted using a virtual (computer simulated) environment. The benefits for virtual fitting include opportunities for practice without injury risk, rapid adjustment of control parameters and the ability for a computer to record accurate performance data. The accuracy of the user's driving may be graphically displayed by generating "Motor Graphs" from the computer's stored time-series data.

Figure 11:
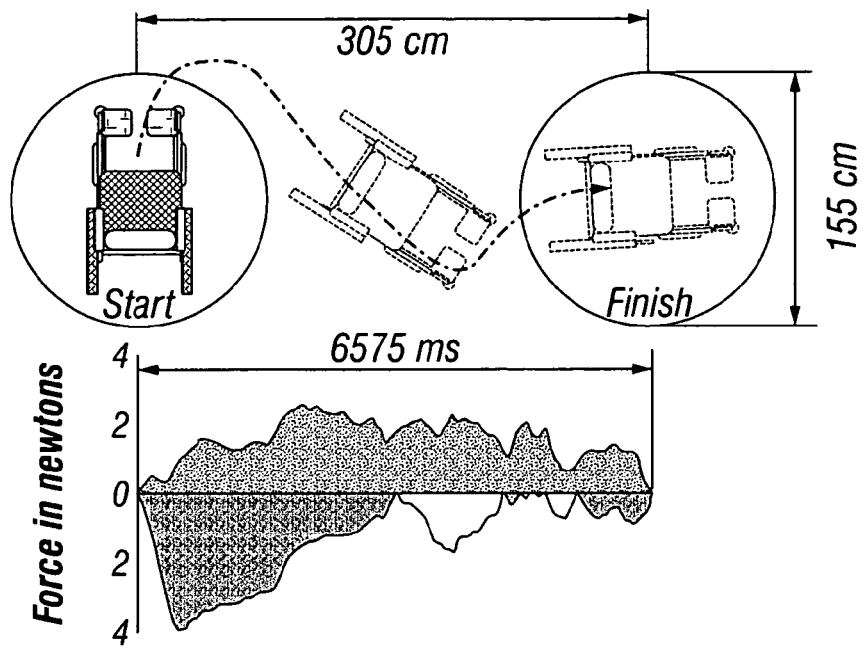
FIG. 11 illustrates an example of a driving task and the corresponding motor graph (unimpaired hand control)

For Motor Graphs, joystick input forces and movements may be continuously recorded as time-series data while the user drives. As illustrated in FIG. 11, for the graphical method for displaying these data, the forward and reverse joystick axes are plotted above the graph centerline. The region below the centerline may be used for plotting left and right turns. The height of any plotted segment may represent the magnitude of the force/movement being applied at that moment. Since forward and reverse data, as well as left and right data are mutually exclusive, there is no overlap in the graphs. Graphs, as shown in FIG. 11, reveal much about an individual's joystick interaction.

Specifically, FIG. 11 illustrates an exemplary driving trial taken from an actual study. During the particular trial for FIG. 11, an electric powered wheelchair 110 was driven from the starting position to a target 305 centimeters to the right. The user begins by applying strong forward and right forces to joystick 100 to quickly turn the chair about 130 degrees to the right. Approximately halfway through the maneuver, some left turn force was applied to straighten out the chair path and during the last third, forward power was decreased to halt the chair. This particular user had a lumbar spinal cord injury and very little hand impairment.

Figure 12:
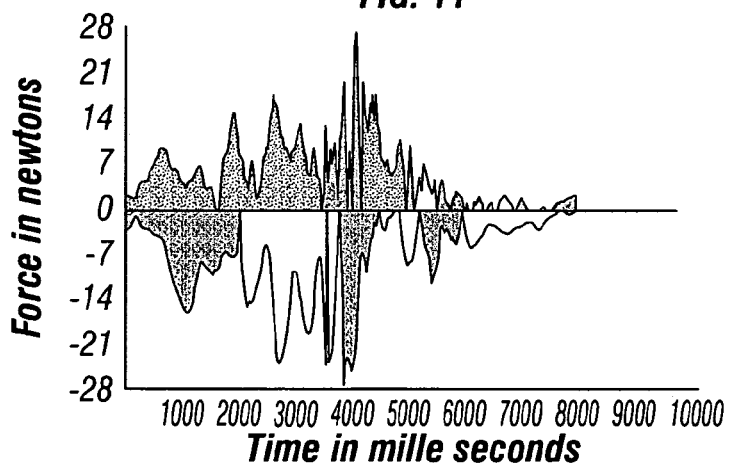
FIG. 12 illustrates a motor graph of the same maneuver of FIG. 11 performed by an individual with cerebral palsy.

FIG. 12, illustrates the control patterns generated by an individual with athetoid cerebral palsy while performing the same trial as for FIG. 11. The raw signal recorded for FIG. 12 illustrates the many transients are apparent as the user drives. In prior studies where only the motion of the entire wheelchair was tracked, these transient signals would be hidden by the inertia of the chair and driver.

Figure 13:
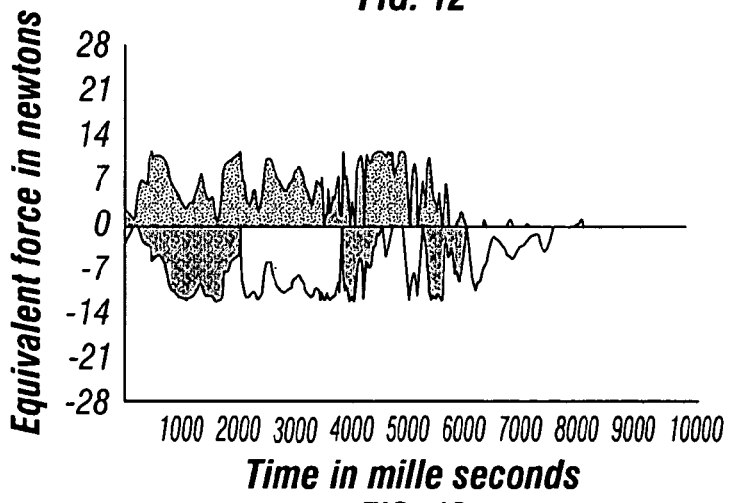
FIG. 13 illustrates an output signal produced by the variable gain algorithm.
Figure 14:
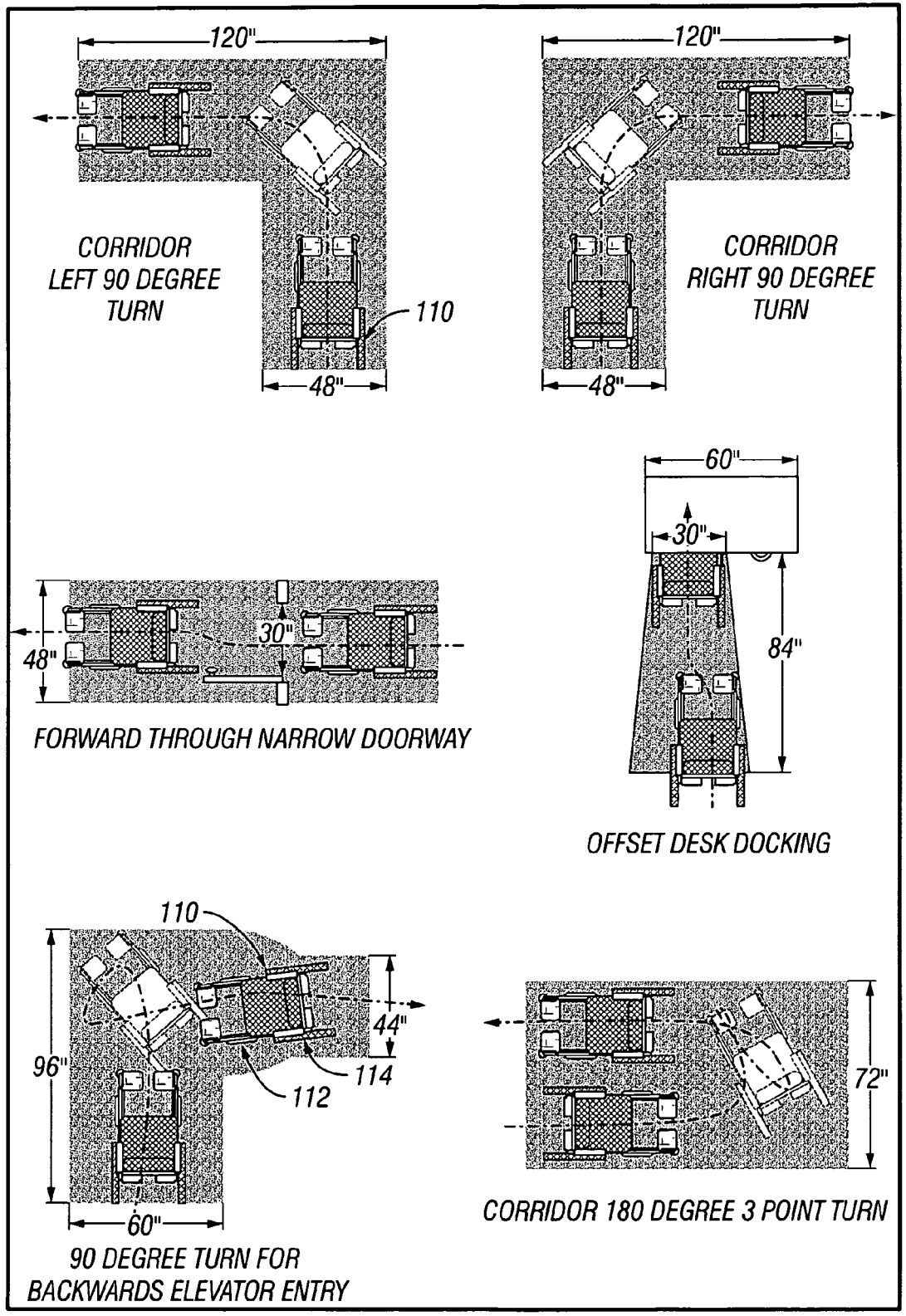
FIG. 14 illustrates another example of virtual driving tasks performed by a user.
Figure 15:
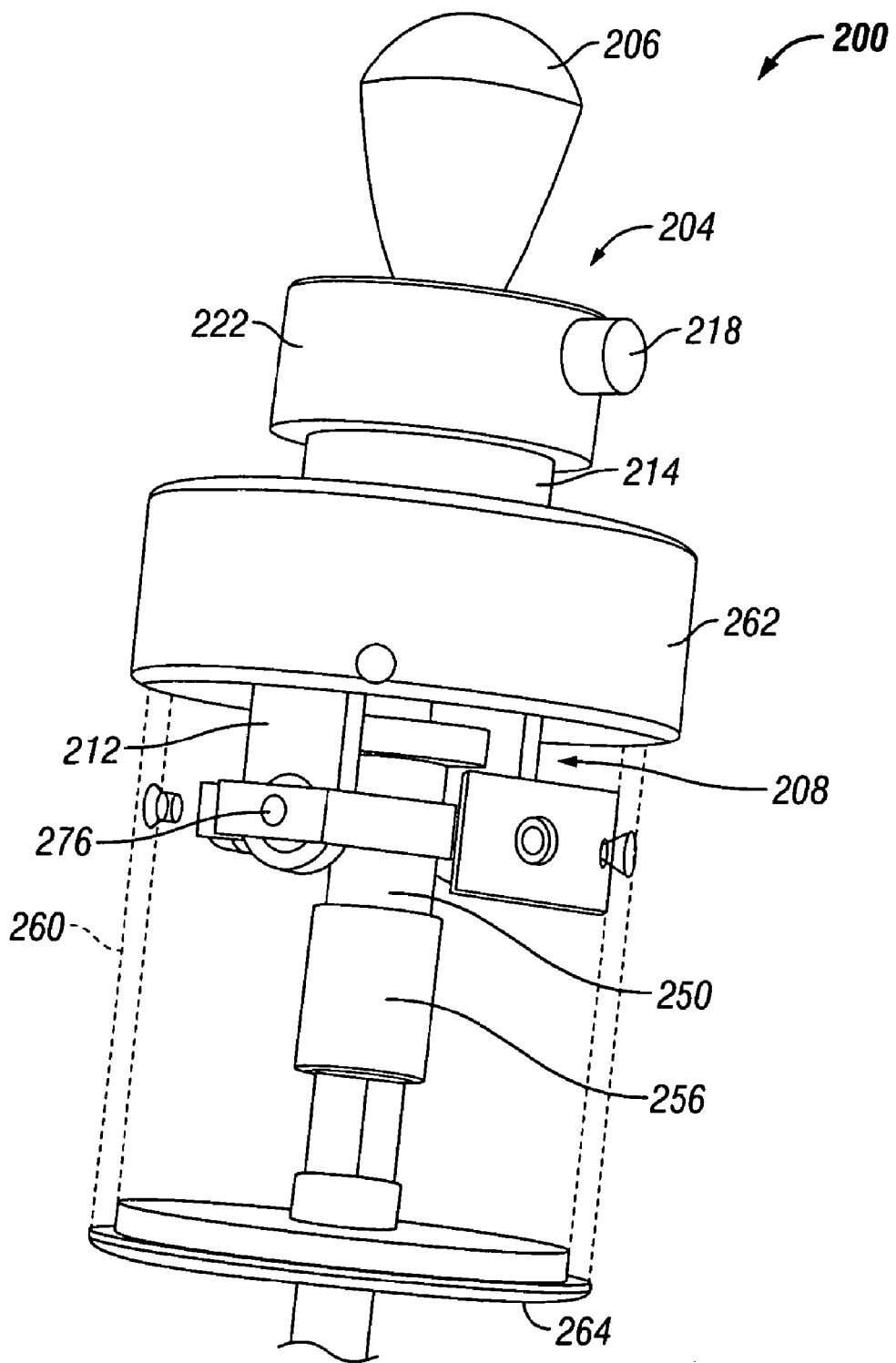
FIG. 15 is an illustration of a second embodiment of a variable compliance joystick according to the present invention.

Lastly, FIG. 13 shows the same trial time-series after processing with a basic, variable gain algorithm, where the weaker signals have gain applied and the sharply spiked transients have been substantially attenuated, resulting in considerably smoother driving. It should be noted that this attenuation is not a fixed cut-off value but one that tracks the contours of the operator's original input. This improved signal is sent to the electric powered wheelchair controller. It should also be noted that any of the driving tasks illustrated herein may have motor graphs generated as they are performed. To judge whether a user is able to drive more accurately following an adjustment to one of his compensation algorithms, the user's motor graph may be compared to a graph generated by an electric powered wheelchair driver without movement disorders performing the same maneuver.

In order for the virtual fitting for Phase One to be meaningful, it is essential that an accurate kinematics model of the actual mobility vehicle be obtained. The steering response, acceleration and deceleration of the virtual vehicle must closely match the prescribed real world vehicle.

Figure 10:
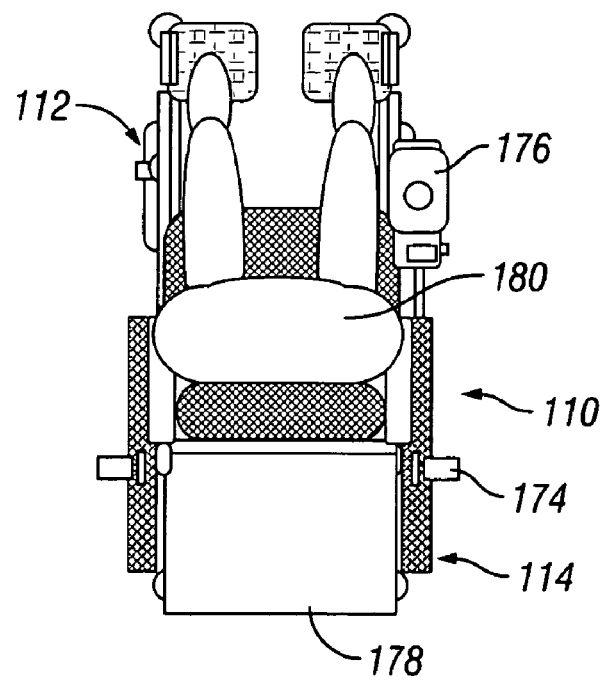
FIG. 10 illustrates a setup for collecting modeling data.

In order to create an Empirical Kinematics Database for a personal mobility vehicle, the onscreen chair must accelerate, turn and decelerate consistent with the user's actual test chair. As shown in FIG. 10, the user's chair may be characterized by temporarily mounting friction driven shaft encoders 174 on the drive wheels, a joystick signal generator 176 and a laptop computer 178. A manikin 180 approximately equal to the user's weight may be strapped into the chair seat. Joystick signal generator 176 may then be activated to execute a pre-recorded set of joystick signals covering representative directions and magnitudes. Computer 178 on the rear of chair 110 may record the joystick signals and the encoder data representing the chair's movement responses. From this session, an empirical kinematic database may be calculated.

The onscreen wheelchair image used for virtual driving may be defined with variables to allow the drive wheel diameters, drive wheel span, caster diameters, wheelbase and caster fork offset values to be assigned. To interpret a joystick action entered during virtual driving, the joystick signal may be matched to the two nearest records in the EKD and the shaft encoder data fields read. The virtual motion may be interpolated from these two records.

Continuing with Phase One, kinematic models of popular wheelchairs and scooters may be provided as part of the virtual software, the only adjustment needed would be to correct for the user's weight and possibly a different floor surface, i.e. the user may live in a home with wall to wall carpet.

Thus, for Phase One, a series of basic joystick inputs without feedback as to driving performance in electric powered wheelchair 110 may be optimized. In order to accomplish this, a user may be asked to rest his or her hand comfortably on shaft 104 of joystick 100. Thereafter, force data in the x and y directions may be collected for a predetermined interval (i.e. 30 seconds) while the user's hand is at rest on the joystick (i.e. no attempt to drive will be made). The user may then be asked to push shaft 104 in the y-direction (i.e. straight ahead) with a light push and hold, moderate push and hold, and maximum push and hold for a minimum period (i.e. 10 seconds each), during which time the forces in the x and y direction may be recorded. The user may then repeat these tasks by pulling in the minus y-direction (i.e. straight back). The user may also be asked to push shaft 104 forward for a predetermined interval (i.e. two minutes) at a force that is comfortable. Next, the user may be asked to exert a force in the plus and minus x-direction (i.e. left and right). The user may be asked to push or pull lightly and hold, moderately and hold, and maximally and hold, in each direction for a predetermined interval (i.e. 10 seconds). The user may also exert a force at a comfortable level in both the left and right directions, each for a predetermined interval (i.e. two minutes). This force data may be used to determine the bias axes, maximum force frequency in the x and y directions, and to set the speed sensitivity. Based upon the force measurements recorded, the optimization software may calibrate the joystick software variables.

As briefly discussed above, the optimization of the variable compliance joystick 100 thus consists of five steps, which involve a series of basic joystick inputs without feedback as to driving performance in the electric powered wheelchair. The steps being, dead-zone calibration, filter frequency determination, bias axis adjustment, software template determination, and fatigue compensation, will now be described in detail.

Specifically, for step one, the resting force data may be used to set the "dead-zone" (i.e. the minimum range of x and y forces that need to be exceeded in order to produce motion of the wheelchair). The dead-zone may be calculated by the following equations:

$$DZ = \underset{a,b}{\mathrm{argmin}}(af_x^2 + bf_y^2) = r^2 \qquad \text{Equation-1}$$

$$f_y^2(k\Delta T) = \theta^T u + e(k\Delta T) \qquad \text{Equation-2}$$

where:

$$\theta^T = \begin{bmatrix} \dfrac{a}{b} & \dfrac{r^2}{b} \end{bmatrix} u = \begin{bmatrix} f_x^2(k_1\Delta T) \ldots & f_x^2(k_N\Delta T) \\ 1\ldots & 1 \end{bmatrix} \qquad \text{Equation-3}$$

Using the least squares criteria:

$$\theta = R^{-1} \times P \qquad \text{Equation-4}$$

where:

$$R=[uu^T] P=[\mu^T f_y^2(k\Delta T)] \qquad \text{Equation-5}$$

The variables definitions for Equations 1-5 are listed in Table-1.

Figure 4:
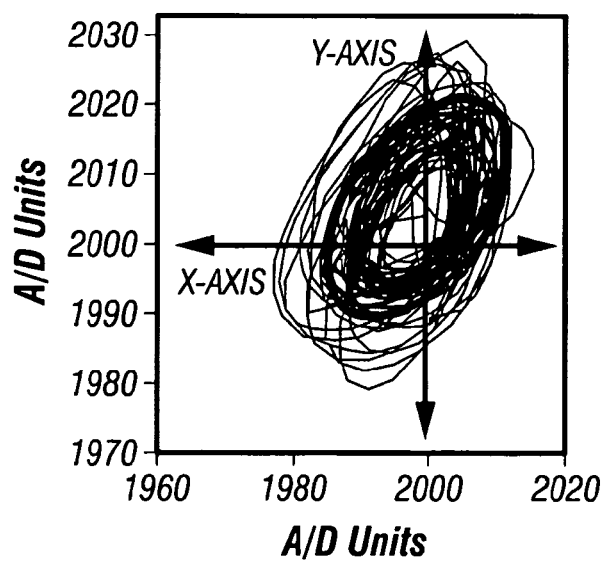
FIG. 4 is a graph illustrating sample data for dead-zone calculation with an ellipse superimposed.

Referring to FIG. 4, the aforementioned equations may be used in an algorithm to calculate the parameters to define an elliptical dead-zone fitted from the data for each user. The parameters that define the ellipse may be increased by 20%, for example, in order to ensure that there is no unintended input to the wheelchair controller, and to ensure that the power wheelchair brakes fully engage when the forces on shaft 104 are within the dead-zone. If the forces on shaft 104 are outside the dead-zone upon start-up of the controller, wheelchair 110 may not move and an error signal may be provided to the user. The user must restart the controller while the forces are in the dead-zone (i.e. lower forces or remove hand from shaft 104) for the controller to start. This would be a safety feature designed to prevent the wheelchair from lunging when powered-up.

For step two, the data from the resting forces, fore-aft forces, and left-right forces may be used to determine the low-pass filter frequency, for example due to tremor or athetoid motion, in the x and y directions. Independent filters for the x and y forces may use second order digital Butterworth Filters having the following filter frequency:

$$F_y(\text{Hz}) = \min[F_{stop_y}(\text{Hz}), F_{forward_y}(\text{Hz}), F_{reverse_y}(\text{Hz}), F_{left_y}(\text{Hz}), F_{right_y}(\text{Hz})]$$

$$F_x(\text{Hz}) = \min[F_{stop_x}(\text{Hz}), F_{forward_x}(\text{Hz}), F_{reverse_x}(\text{Hz}), F_{left_x}(\text{Hz}), F_{right_x}(\text{Hz})]$$

The variables definitions for the above-identified filter frequency are listed in Table-2.

Figure 5:
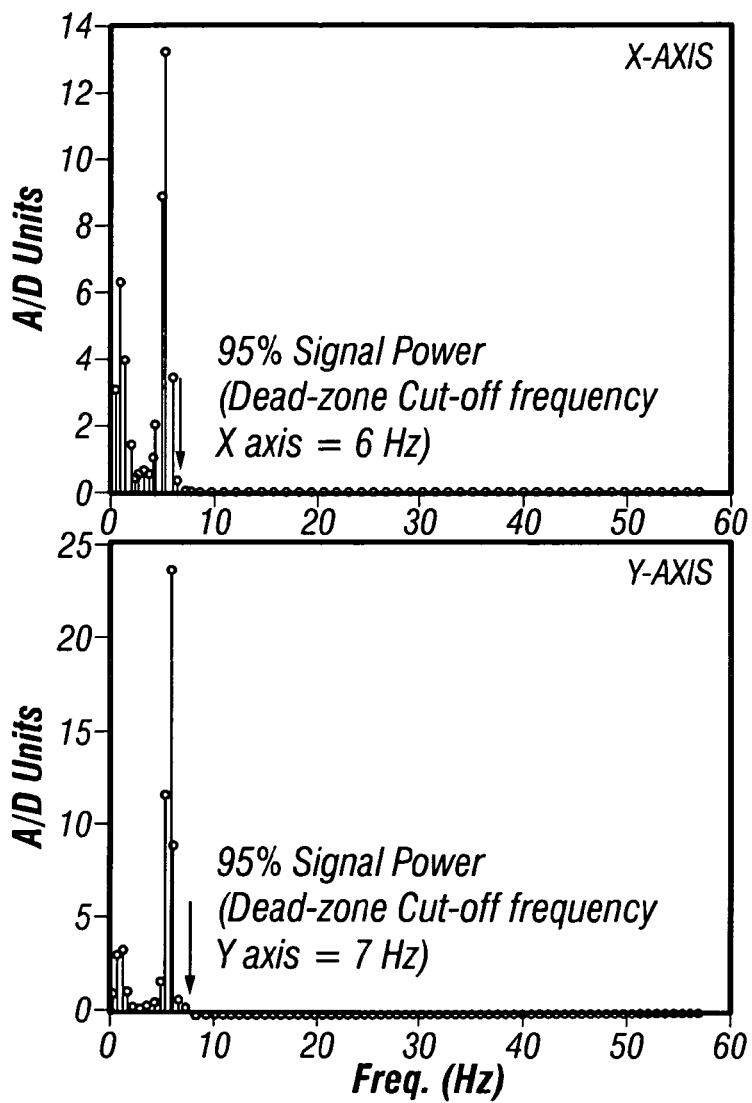
FIG. 5 is a graph illustrating power spectral density estimates from data collected while the hand of a user is resting on the shaft of the variable compliance joystick of FIG. 1, the low-pass filter frequency being shown for both axes.

The optimal cut-off frequencies for the x and y force filters may be chosen as the minimum of the 95% power frequency for each of the test cases. Referring to FIG. 5, a sample data set displaying the y-directional force in the frequency domain along with the boundary frequency at 95% is displayed. People with upper extremity impairments often have better control in a direction other than the orientation of the joystick axis. Limited ability to accommodate individual bias may be provided by using specialized mounting hardware and an iterative process to determine the most appropriate angle at which to position joystick 100. Joystick 100 may automatically calculate the bias axes and adjust the force outputs in software.

An additional advantage of the joystick 100 is that the x and y axes do not need to be orthogonal as with current joysticks, hence, individual bias axes may be calculated for the forward and turning axes of wheelchair 110. Therefore, for step three, the bias axes may be calculated using the following equations, and thereafter adjusted:

Straight Test (forward and reverse):

$$\hat{f}_y(k\Delta T) = m_{straight} f_x(k\Delta T) \qquad \text{Equation-6}$$

Turning Test (left and right):

$$\hat{f}_x(k\Delta T) = m_{turn} f_y(k\Delta T) \qquad \text{Equation-7}$$

Test to measure if axes are orthogonal:

$$C = \frac{\hat{f}_y(k\Delta T)}{\|\hat{f}_y(k\Delta T)\|} \cdot \frac{\hat{f}_x(k\Delta T)}{\|\hat{f}_x(k\Delta T)\|}$$ Equation-8

The variables definitions for Equations 6-8 are listed in Table-3.

Figure 6:
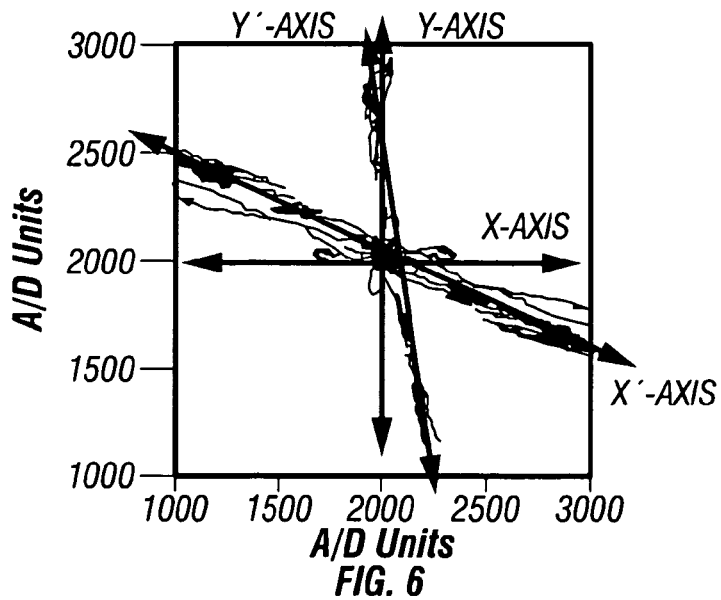
FIG. 6 illustrates bias axes (x', y') for a particular case in which the bias axes were not orthogonal.
Figure 7:
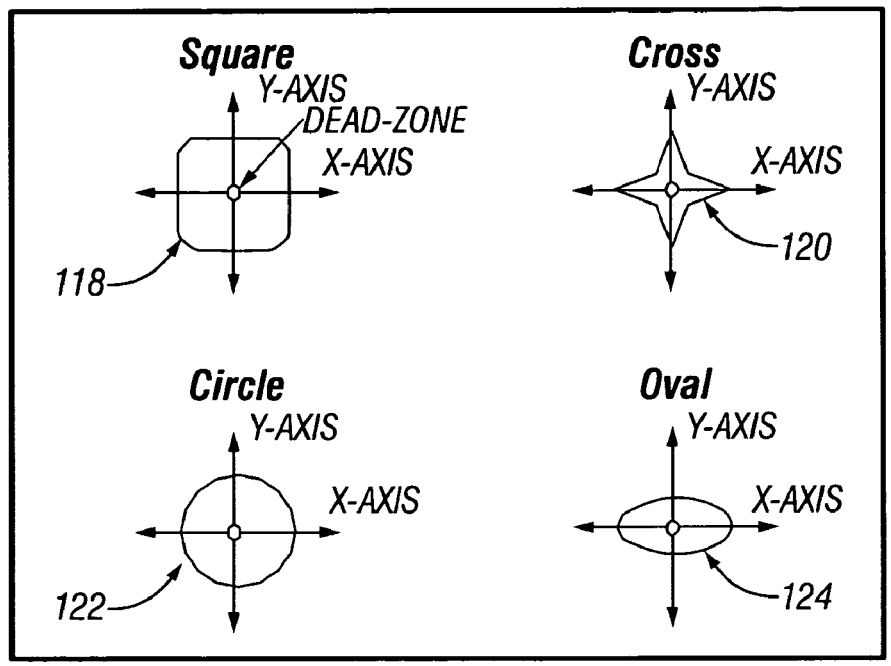
FIG. 7 illustrates sample software templates, with the square template being the default template for the variable compliance joystick of FIG. 1.

Referring to FIG. 6, in the above-identified method of calculating the bias axes, the constant C is the dot product of the unit vectors along the direction of the forward-reverse and left-right bias axes. If the bias axis analysis provides viable solutions, software may transform the forward and turning axes for the wheelchair to be aligned with the bias axes. The bias axes may be calculated from the force data obtained when subjects are asked to exert forces fore, aft, left and right at low, moderate, and high levels.

For present isometric joysticks, subjects have reported experiencing fatigue after driving for several minutes with an isometric joystick, due to the individual pushing much harder than is required to attain maximum speed or rate of turning. This problem is most prevalent among people who are fully capable of operating a position-sensing joystick. Therefore, gains may be set by using the mean of the force values in the x and y direction, respectively, during the middle minute (30 seconds to 90 seconds) of the aforementioned two minute session of applying a force at a comfortable level. Gains may be calculated using the following equations:

Initiating the x and y gains:

$$\text{Gain}_y = \frac{\text{Range}_{y_{controller\_input}}}{f_{y_{comfort}} - f_{y_{dead-zone}}}$$ Equation-9

$$\text{Gain}_y = \frac{\text{Range}_{x_{controller\_input}}}{f_{x_{comfort}} - f_{x_{dead-zone}}}$$ Equation-10

The variables definitions for Equations 9 and 10 are listed in Table-3.

In order to initiate the x and y gains, a linear gain may be used from the joystick forces, along the bias axes, to the wheelchair controller input signals. Alternatively, a non-linear gain function may be used. The gains may be initiated using Equations 9 and 10 above. The software used to tune joystick 100 may permit adjusting the limits for forward and reverse speed, and left and right rate turning by using a sliding bar with a range of 10% to 150% of the initial value.

For step four, software Templates are typically stamped or machined pieces of metal placed over joystick housing 102 to restrict the motion of shaft 104. Essentially, shaft 104 hits the wall of the template and is restricted from moving further. Templates may be used to control bias, decrease the throw of shaft 104, or reduce the degrees of freedom of movement thereof. Software templates may be incorporated into joystick 100, and may be based on the mathematics of super quadratics.

Super quadratics use mathematical equations to describe complex shapes. The math behind super quadratics has its origin in computer graphics and data compression. The benefit of super quadratics is that a sliding bar (i.e. adjusting a single parameter) can be used to adjust the software template shape from a square, circle, cross, ellipse or diamond. Hence, complex templates can be generated for each user of joystick 100 in a simple understandable manner. For the exemplary templates illustrated in FIG. 7, as the position of the sliding bar changes, the shape of the template may be displayed on a computer screen. A clinician may be allowed to rotate the axes of the template via a sliding bar to improve the user's performance. After the desired template has been selected, it may be downloaded into the memory of joystick 100. In the exemplary embodiment of FIG. 7, square, cross, circular and oval templates 118, 120, 122 and 124, respectively, may be used.

Figure 9:
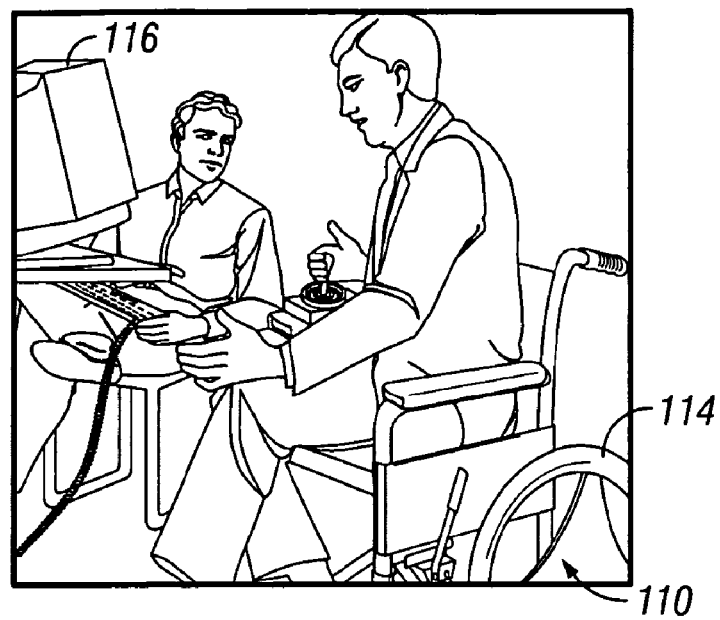
FIG. 9 illustrates a user driving an electric powered wheelchair through a virtual environment for the wheelchair driving simulator according to the present invention.

Thus for step four, as shown in FIG. 9, a computer monitor 116 may be moved in front of the user and positioned for optimum viewing. The user may be instructed to track a pseudo-randomly-moving 10 mm square object. The computer may record the user's hand forces/movements and convert them into motor performance graphs. By comparing these graphs, algorithm changes may be selected by the therapist, transformed into the appropriate micro code, and flashed onto the embedded processor's EEPROM memory. The calibration cycle may be repeated up to four times during a during a period of 90 minutes.

Additionally, for step four, the user may perform virtual driving with two different joysticks, each joystick being presented on a separate visit. Joysticks may be selected from a standard movement sensing joystick, a force sensing joystick with a standard algorithm known as Variable Gain Algorithm, variable compliance joystick 100 with the movement sensing personally fitted algorithm and the movement-sensing joystick with the movement sensing personally fitted algorithm. One of the four joystick-algorithm combinations may be randomly selected and mounted. The virtual driving program on the computer may be started, with an

TABLE 5

Gain Scheduling Control Algorithm $$K = \begin{cases} K_1 = K_{max} - (K_{max} - K_{min})e^{-\alpha T} & F > F_{dead-zone} \\ K_2 = K_{min} - (K_1 - K_{min})e^{-\beta T} & F \leq F_{dead-zone} \end{cases}$$

| Variables | Description |
| --- | --- |
| F | The time-varying force sensed by the joystick |
| $F_{dead-zone}$ | Largest force within the dead-zone |
| $F > F_{dead-zone}$ | Joystick is being used actively (use eq. $K_1$) |
| $F < F_{dead-zone}$ | Joystick is inactive (use eq. $K_2$) |
| α | Fatigue rate tuned for individual user, the rate of increase when the joystick is active |
| β | Recovery rate tuned for individual user |
| $K_{max}$ | Maximum gain set for individual user |
| $K_{min}$ | Baseline gain; no fatigue compensation. |
| T | Recovery time, duration while joystick is inactive. | investigator presenting selected onscreen driving tasks to the user using a balanced randomization scheme. The computer may track the edge of the virtual electric powered wheelchair silhouette and beep if the user attempts to exceed the boundary. The exemplary tasks may be chosen from the ones illustrated in FIG. 14. The correct procedure for executing each task may be explained, and the user may be allowed to drive each maneuver with the joystick three times at a relaxed pace for familiarization. The user may be instructed to perform each maneuver as fast as practical without letting the onscreen chair stray over the gray boundary, with the investigator advising the user that driving accuracy is more important than completion speed. The intended path for the onscreen chair may be marked with a dotted line. Using automated data collection software, the computer may record the virtual chair's position and the forces or motions applied by the user to the joysticks may be recorded. Additionally, time required to complete each maneuver in milliseconds and the number of boundary violations may be recorded. Users may perform forty eight trials, for example, for data collection in a session lasting about seventy minutes (i.e. one joystick, times six driving maneuvers, times eight presentations of each maneuver).

Thereafter, for step five, some diseases and disorders result in substantial changes in motor strength and control during the course of a day. Thus, another advantage of a micro controller managed joystick, is that in addition to employing corrective algorithms to compensate for movement disorders, a change in sensitivity may be programmed to take place over time. To determine the changes brought on by fatigue, users may be asked to repeat the virtual driving testing protocol at 10:00 am, 12:00 pm, and 2:00 pm, for three sessions in a virtual laboratory.

As users perform the virtual tasks for Phase Two above, those prone to fatigue would be expected to exhibit progressively "flatter" motor graphs in the later task iterations. The joystick's microcontroller may be used to log cumulative force-time activity (a cumulative integral) as a user performs successive trials. All forces may be logged as absolute values. For each user, parameters alpha and beta for the fatigue-scheduling algorithm depicted in Table-5 may be established.

This would constitute the gain intervention, which may be superimposed on the user's other algorithm compensation. As the amount of uninterrupted joystick usage accumulates, the gain may be increased until a point of diminishing returns occurs ($K_{max}$). If the gain is raised too high, tremor or other unintentional movement may be amplified to the point of becoming the limiting factor. A fatigue recovery algorithm may also be included based on the assumption that if the user stops driving and receives a rest break, the gain can be backed off. After a specified period, i.e. eight hours of inactivity, the fatigue gain compensation may be reset and only the customized algorithms used. By logging the accumulated force-time integral and including a recovery algorithm, individuals may be able to drive in the community in the future with an optimum gain setting throughout the day.

Lastly, for Phase Three, a user may drive his/her personal electric powered wheelchair in an indoor and outdoor driving course known as The Wheelchair Driving Activities Laboratory (WDAL). The WDAL has been used in several previous studies performed herein to effectively evaluate new assistive technologies, especially wheelchairs and wheelchair controls, prior to evaluation in the "real-world". The WDAL includes indoor driving skills for driving in environments including as tile flooring, carpeting, a door threshold, a doorway, a hallway, model bathroom, and model kitchen. The WDAL outdoor driving tasks include an ADA ramp, bus docking area, curb-cut, sidewalk, and decking material. Users may be tested on all of these activities. Each user may be given the opportunity to practice each of the driving tasks, but not to practice the test course. After a maximum of one-half hour of practice in the WDAL, users may undergo the testing protocol. A study clinician may be given the option to tune the algorithms during the respective practice sessions using the same procedure as in Phase Two. At the completion of a practice session, a study therapist or rehabilitation engineer may rate each user as being either safe or unsafe in performing each driving task. If a user performs all of the driving tasks safely, than they would progress to the testing phase. Users who are judged unsafe may have a maximum of two, one-hour remedial training sessions prior to testing, otherwise they may be discontinued.

The hardware for implementing the aforementioned method of systematically determining the optimal settings for variable compliance joystick 100 will next be described in detail. Specifically, the setup for algorithm optimization for joystick 100 may include a computer monitor 116, for displaying virtual driving tasks on a wheelchair dynamometer. The driving tasks may be presented on monitor 116, and users may receive real-time feedback of their driving by viewing the sprite on the monitor screen. The motion of the sprite may be proportional to the actual rotation of the wheelchair wheels on the dynamometer.

Figure 8:
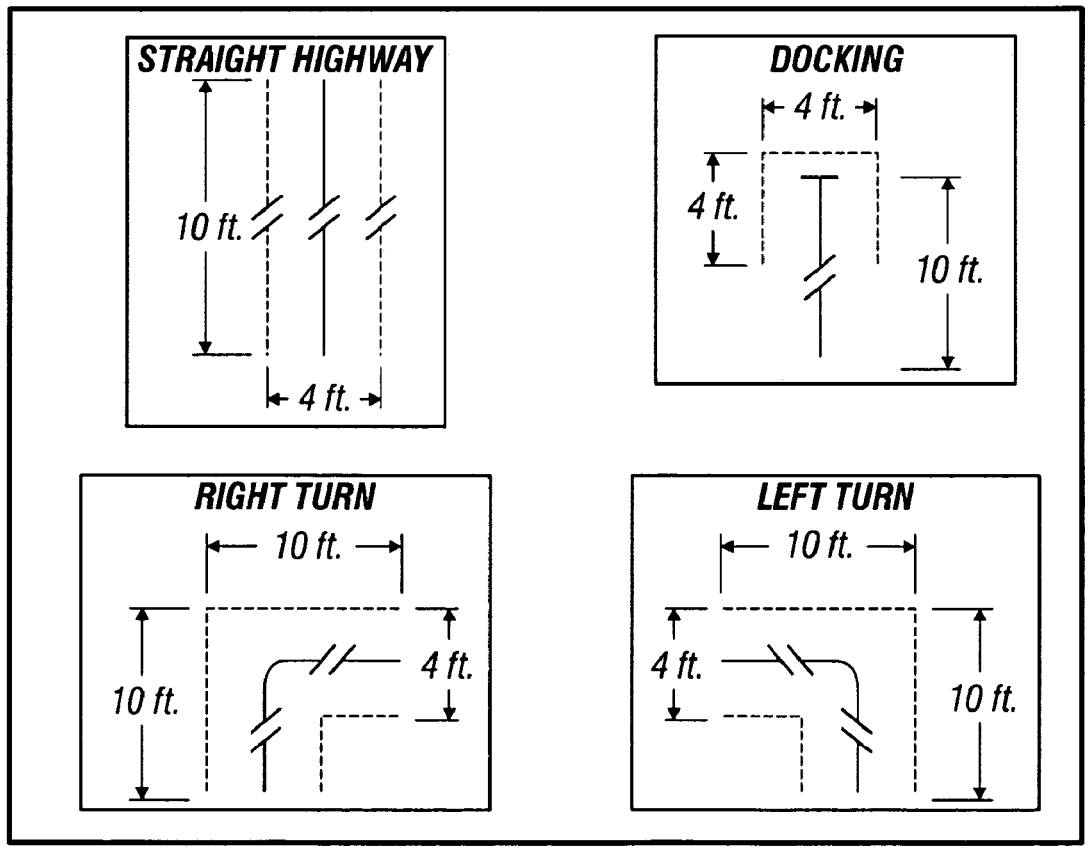
FIG. 8 illustrates virtual driving tasks performed by a user, with the desired path indicated in solid lines and the virtual walls being represented by dashed lines.

Referring to FIG. 8, the sprite may flash and change color when it contacts a wall, and a running total of wall hits may be displayed on the screen of monitor 116. The driving tasks may be performed while driving forwards and then repeated while driving backwards for a total of eight driving trials (i.e. 4 tasks×2 orientations). The driving tasks may be presented in the following order: (1) straight hallway, (2) left turn, (3) right turn, and (4) docking. Based upon previous studies, these tasks are preferred since they have been demonstrated to elicit differences in the driving performance of a wheelchair. The driving task order may be selected to allow user to learn with simple tasks and progress to more complex tasks.

Joystick 100 may start with the software in the default setting (all speed and directional setting at their minimum, and the virtual template set as a cross aligned with the x and y axes). While users are performing the driving tasks with joystick 100, a study investigator may tune joystick 100 parameters (i.e. speed limits, turning limits, and the shape and orientation of the software template) to optimize each user's performance. A licensed therapist specializing in Assistive Technology or a rehabilitation engineer may observe each user while driving in the virtual environment. At the completion of each task, a study therapist may rate each user as either being safe or unsafe in performing the task. Users may move into the performance analysis process once they are able to perform all of the virtual driving tasks safely. If a user is unable to perform all of the virtual driving tasks with a safe rating within a predetermined time period (i.e. 30 minutes), the optimization process may be suspended. In order to determine the safety of joystick 100, the joystick may be tested for compliance ISO 7176-14, a regulation for specifying the operation of control devices for use on electric powered wheelchairs. Both normal operation and foreseeable misuse may be tested in ISO 7176-14. This standard includes bench tests (i.e. low voltage operation, over voltage protection, connector quality) and driving performance tests (i.e., braking, acceleration).

In order to compare the virtual driving to driving in a controlled environment, a computerized tracking system may be used to evaluate the use of devices for control of electric powered wheelchair 110. In a clinical study conducted herein, joystick 100 including compensation algorithms was compared to a conventional position-sensing joystick. The manual performance of each joystick was measured for five inexperienced electric powered wheelchair users and five experienced electric powered wheelchair users who have tetraplegia. The users with tetraplegia, aged 32 to 50, had spinal cord injuries or dysfunctions at level C4-C6. Each used an electric powered wheelchair 110 as their primary means of mobility, using a position sensing joystick by hand. Each joystick had a similar housing and handle, and each joystick was mounted in a position preferred by the user. A computer (not shown) recorded the speed of each wheel, computed the virtual position and orientation, and displayed this information on the screen in real-time. All users used conventional handles except for one user with tetraplegia, who used a T-shaped handle since he was unable to use the knot handle. The users used an electric powered wheelchair while stationary on a wheelchair dynamometer to simulate inertial effects. Operating the electric powered wheelchair with each joystick, the users followed two-dimensional driving tasks displayed on a computer monitor. A moving sprite displayed virtual motions of the electric powered wheelchair. The root mean square error (rmse) was computed as users followed a series of driving tasks while following a pre-defined desired path. A paired t-test ($p<0.05$) showed no significant differences in the root mean square error between the two joysticks. Each user demonstrated acceptable, comparable tracking performance using each joystick. Ten unimpaired users and ten users with tetraplegia, who used position sensing joystick controlled electric powered wheelchairs for their mobility, participated in a clinical study to compare the use of a conventional position-sensing joystick and variable compliance joystick 100. Using each joystick, tracking errors were measured while users perform computerized tracking and actual driving. Results indicated that joystick 100 and the conventional position-sensing joystick provide statistically comparable electric powered wheelchair control for both groups during both virtual driving and driving activities laboratory tasks.

Prior to developing the compensation algorithms, joystick 100 with Compensation Algorithms was tested against existing wheelchair standards, and compared to a commercial position sensing joystick. When averaged across all users (both controls and impaired users), the root mean square tracking error and time to complete the driving course constructed on a level asphalt parking lot were not significantly different (i.e. $p<0.05$) for the two joysticks. Results within a user, however, did show significance. Across all users, nevertheless, joystick 100 was superior to the conventional position sensing joystick for two tasks: driving straight and driving in a circle.

In another study performed herein, Fitts' Law for target acquisition was extended to a continuously updated target. The extended Fitts' Law was used to examine electric powered wheelchair driving with a conventional position sensing joystick and variable compliance joystick 100. The test results showed significant differences ($p<0.05$) among the two types of joysticks for selected measures of information processing capacity, movement time, root mean square error, and average velocity while performing turning maneuvers. The mean values indicated that variable compliance joystick 100 provides superior turning and close quarter (i.e. indoor) performance.

In summarizing variable compliance joystick 100 described above may be mechanically configurable and include variable compliance to full isometric to be adapted for best use by a user, and/or include dampening to reduce effects of unwanted motion. Joystick 100 may incorporate compensation algorithms, including a dead-zone for determining an elliptical area where joystick 100 ignores input, and filtering to reduce effects of tremors and other spurious motions. Moreover, the axes of motion need not be orthogonal, thus enabling the finding of the best directions for forward, reverse, left and right directions. Joystick 100 may also include software templates of various shapes generated with a single parameter. Joystick 100 may be used with the wheelchair simulator discussed above for facilitating the matching of joystick mechanical and software parameters to individual users.

One of ordinary skill in the art will appreciate in view of this disclosure that the wheelchair simulator disclosed herein may have application to other vehicles, such as cars, scooters, remotely controlled vehicles and for robotics.

The second embodiment of variable compliance joystick 200 will now be described in detail with reference to FIGS. 15-18. It should be noted that the features and methods discussed above with reference to FIGS. 4-14 for joystick 100 are likewise applicable to joystick 200, as would be readily apparent to those skilled in the art.

Figure 17C:
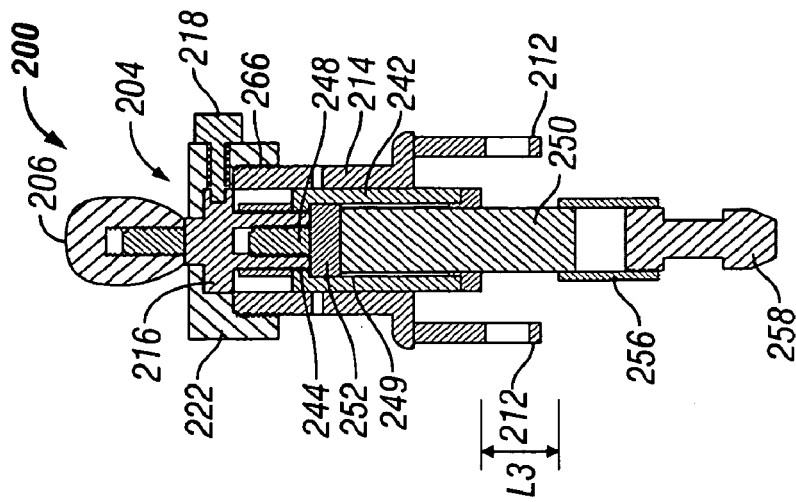
FIGS. 17A-17C are views of the compliance and dampening components for the variable compliance joystick of FIG. 15.
Figure 17B:
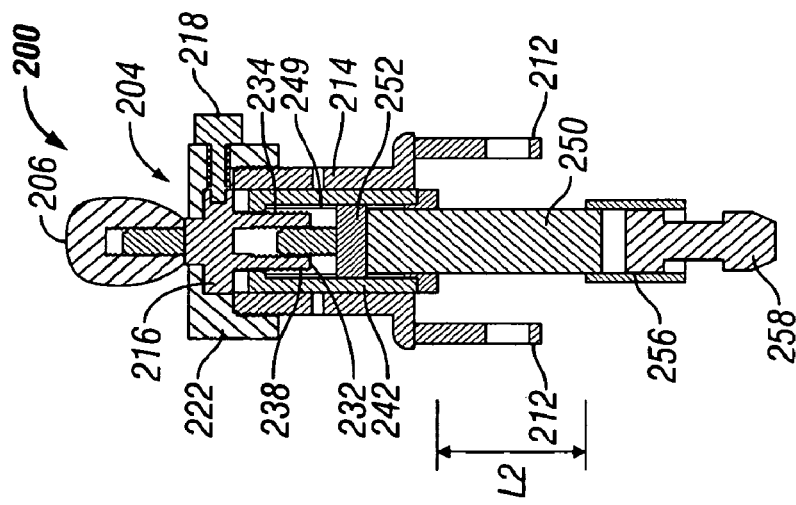
Figure 17A:
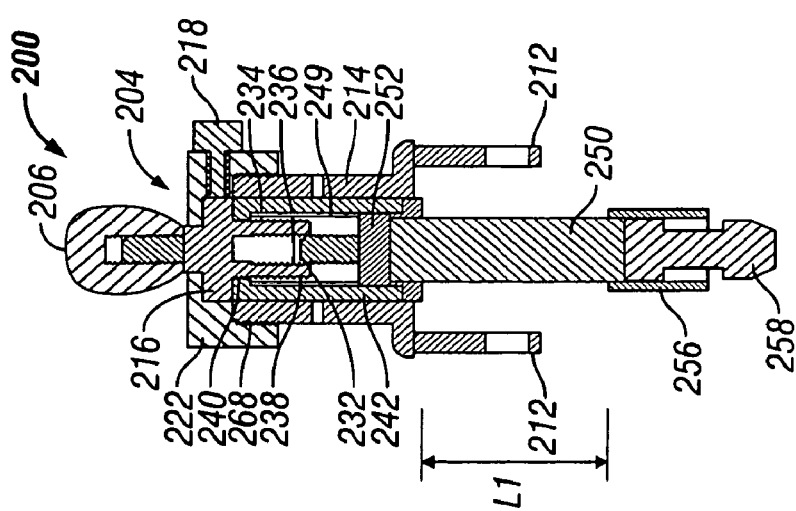
Figure 18:
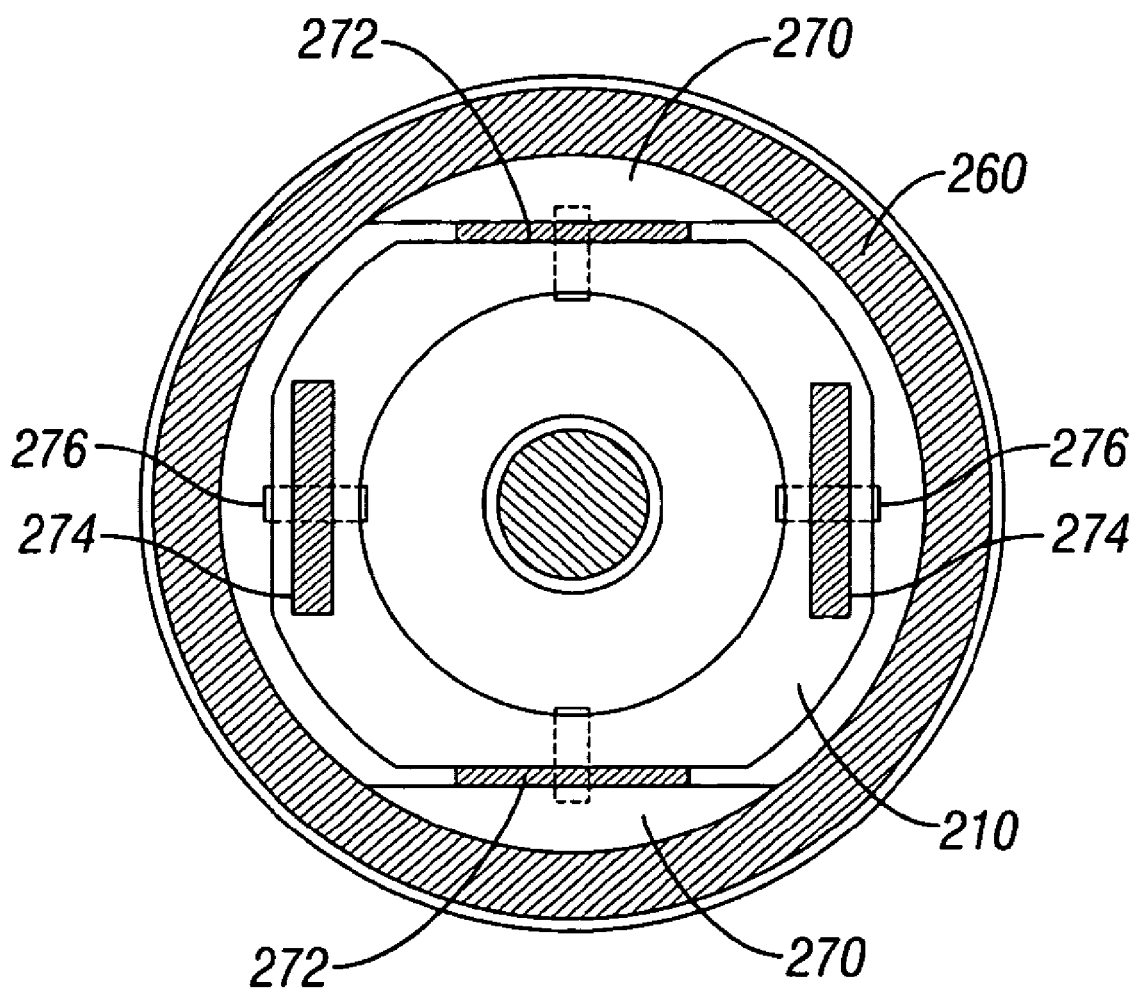
FIG. 18 is a cross-sectional view substantially along line 18-18 in FIG. 16, illustrating the mounting arrangement for the gimbal ring.

Turning now to FIGS. 15-18, joystick 200 may include a housing (not shown) similar to housing 102, and shaft 204 having a handle 206 at an upper end thereof. An open center gimbal 208 may be provided for further stabilizing the bending of flexible extension 250 (similar to flexible extension 136 of the first embodiment). Gimbal 208 may include hollow gimbal ring 210, including pivotally mounted yoke legs 212 at pivot pins 276; the yoke legs being further affixed to circular yoke column 214. As shown in FIG. 18, yoke legs 212 may be disposed in suitable apertures 274 in ring 210. Gimbal ring 210 may be further pivotally mounted on bushings 272 whose journals 270 may be permanently attached to the walls of enclosure 260. As also illustrated in FIG. 18, journals 270 may be crescent shaped. Consequently, gimbal ring 210 pivots about bushings 272 and yoke legs 212 pivot on pins 276, thus creating a universal joint arrangement for pivotal movement of joystick shaft 204. An index bushing 216 may be rotatably affixed to handle 206 for adjusting the compliance of joystick 200, as will be discussed in greater detail below.

Figure 16:
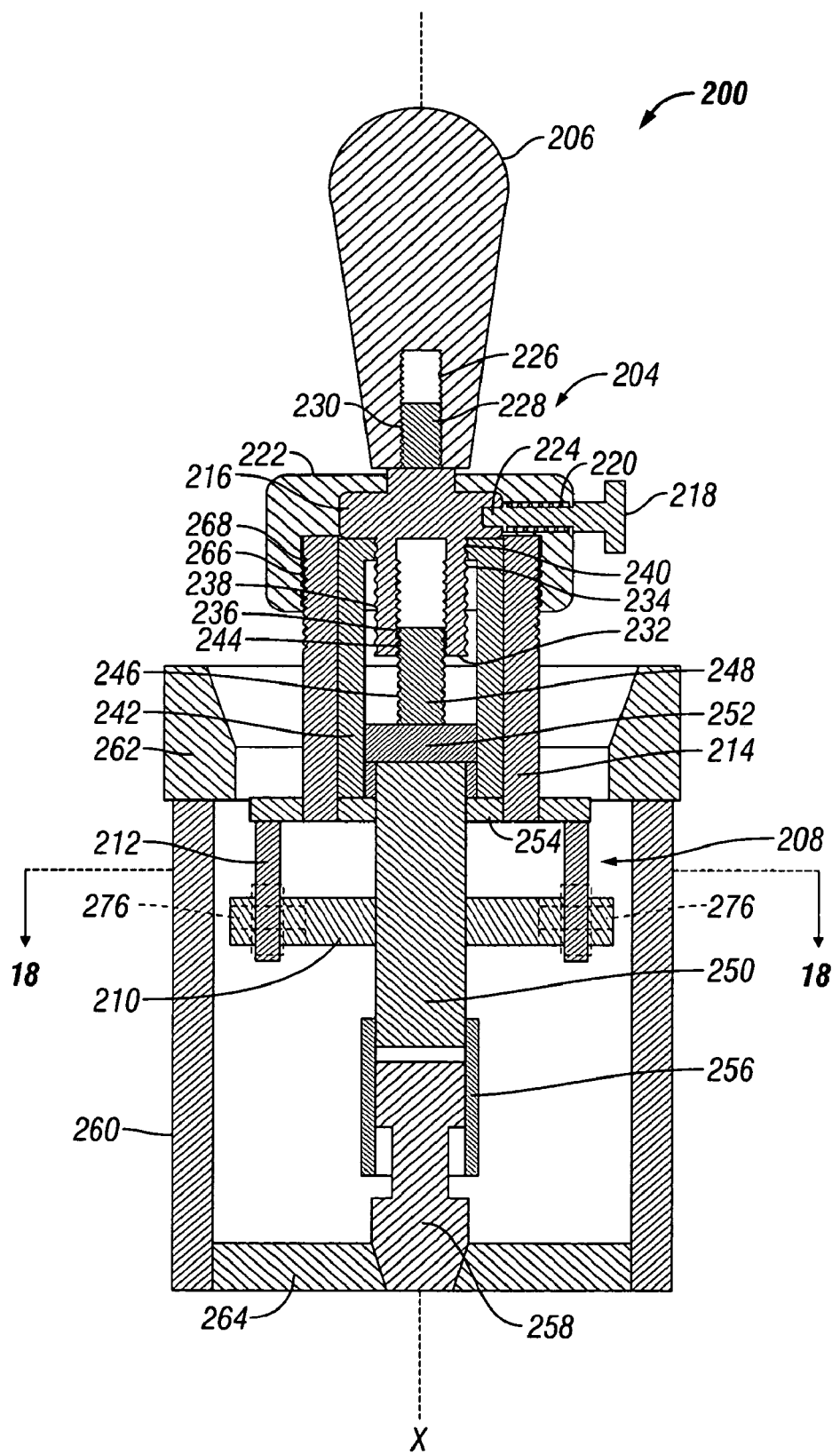
FIG. 16 is a illustrative sectional view of the variable compliance joystick of FIG. 15, illustrating the various internal components of the joystick.

A locking spring plunger 218 may be biased into the engaged configuration illustrated in FIG. 16 by means of spring 220 to lock rotatable index bushing 216 with yoke cap 222, and thus prevent joystick compliance adjustment. As illustrated in FIG. 16, plunger 218 may include a pin 224 disposable within a complementary hole (not shown) in index bushing 216 to operatively connect yoke cap 222 with index bushing 216 and thereby prevent rotation of index bushing 216.

Handle 206 may include a bore having internal threads 226 for mounting onto externally threaded stud 228, which includes complementary threads 230 for engagement with threads 226 and is fixedly mounted to index bushing 216. Handle 206 may thus rotate index bushing 216 via the fixed mounting thereof to stud 228.

Index bushing 216 may include a bottom index adjustment section 232 including an externally threaded section 234 and internally threaded section 236. Threads 238 of externally threaded section 234 may be disposed in engagement with complementary threads 240 of cylindrical chamber column 242, which may axially translate relative to yoke column 214. Threads 244 of internally threaded section 236 may be disposed in engagement with complementary threads 246 of drive stud 248. Threads 238 and 244 may be configured such that rotation of handle 206 in a clock-wise direction (when viewed from the top of the joystick) allows for upwards axial translation of stud 248 and downwards translation of chamber column 242, and vice-versa for opposite rotation of handle 206. As shown in FIG. 17A, axially extending splines 249 may be provided on the internal wall of column 242 for engagement with complementary axial grooves (not shown) in the outer wall of retainer 252 for preventing either column 242 or the retainer 252 from rotating relative to each other, while allowing relative axial translation of column 242 and retainer 252.

In the particular embodiment illustrated, index bushing 216 may include male threads 238 in the form of ½"×20 left hand threads for mating with complementary female threads 240 of column 242. Further, index bushing 216 may include female threads 244 in the form of ¼"×20 right hand threads for mating with complementary male threads 246 of drive stud 248.

Stud 248 may be fixedly affixed to flexible extension 250 disposed at a lower end of the shaft. Extension 250 may be made of an elastimeric or polyurethane material. As illustrated in FIG. 16, extension 250 may be mounted at a first end thereof to stud 248 by means of retainer 252 and held within bushing 254 for controlling the bending thereof. Extension 250 may be bonded, or otherwise fixedly attached, at its second opposite end to sleeve 256. Sleeve 256 may be dimensioned to closely fit but slide freely over isometric post 258.

The entire assembly including gimbal assembly 208, yoke column 214, extension 250 and isometric post 258, including the various sub-components operable therewith, may be substantially enclosed within enclosure 260, which includes internally tapered stop ring 262 at an upper end thereof and further includes an enclosure base 264 at a lower end thereof. Stop ring 262 essentially limits the extent of pivotal movement of the joystick shaft 204 by virtue of its engagement with the outer surface of yoke column 214. Isometric post 258 may be utilized for controlling joystick 200 in a similar manner as joystick 100.

In operation, referring to FIGS. 16-17, as briefly discussed above, compliance of joystick 200 may be adjusted by first disengaging locking spring plunger 218 from index bushing 216 by pulling plunger 218 to retract pin 224 from the hole in bushing 216. Handle 206 may now be rotated to vary the compliance of joystick 200.

Specifically, as shown in FIG. 17A, joystick 200 is illustrated in a maximum compliance configuration, as opposed to medium compliance for FIG. 17B and minimum compliance for FIG. 17C. In the maximum compliance configuration of FIG. 17A, handle 206 may be rotated counter-clockwise (when viewed from the top of the joystick) to its maximum counter-clockwise rotatable position to provide maximum downwards axial translation of stud 248 and maximum upwards translation of chamber column 242. Concurrently with the translation of stud 248 and column 242, sleeve 256 may likewise travel relative to isometric post 258, and in the particular embodiment illustrated, extension 250 may be disposed in contiguous engagement with post 258. Further, in the particular embodiment illustrated, the position of FIG. 17A provides an exposed extension length L1 of approximately 1.0". Thus as extension 250 is disposed outside of the chamber defined by column 242, the maximum amount of extension 250 is available for bending. In the position of FIG. 17A, it can be seen that enclosure 260 having gimbal assembly 208 disposed therein limits pivotal movement of joystick shaft 204, thus providing an additional means for controlling bending of extension 250.

In order to reduce the compliance of joystick 200, referring to FIG. 17B, handle 206 may be rotated clockwise (when viewed from the top of the joystick) to an intermediate rotatable position to allow upwards axial translation of stud 248 and downwards translation of chamber column 242. Concurrently with the translation of stud 248 and column 242, sleeve 256 may likewise travel upwards relative to isometric post 258, such that extension 250 is no longer in contiguous engagement with post 258. In the particular embodiment illustrated, the position of FIG. 17B provides an exposed extension length L2 of approximately 0.650". As extension 250 is now disposed within the chamber defined by column 242, a smaller amount of the exposed extension is available for bending.

Lastly, in order to further reduce the compliance of joystick 200, referring to FIG. 17C, handle 206 may be rotated clockwise (when viewed from the top of the joystick) to a maximum clockwise rotatable position to provide maximum upwards axial translation of stud 248 and maximum downwards translation of chamber column 242. In this arrangement, the top surface of retainer 252 is disposed in contact with the inwardly facing section of column 242, as shown in FIG. 17C. Concurrently with the translation of stud 248 and column 242, sleeve 256 may likewise travel upwards relative to isometric post 258. In the particular embodiment illustrated, the position of FIG. 17C provides an exposed extension length L3 of approximately 0.40". As the maximum length of extension 250 is now disposed within the chamber defined by column 242, the smallest amount of the exposed extension is available for bending, while still providing compliance for joystick 200.

For the embodiments of FIGS. 14-17, compared to joystick 100 of the first embodiment, joystick 200 allows extension 250 to generally remain centered about the pivot axis X of gimbal 208 through the entire compliance adjustment thereof, as well as during subsequent use. Further, yoke cap 222, which includes internal threads 266 engaged with complementary threads 268 of yoke column 214, can be simply screwn onto column 214 for assembly and further unscrewn from column 214 for replacement of the entire assembly for extension 250 with a polyurethane rod of different durometer. This replacement feature extends the potential range of compliance options for joystick 200.

In summarizing, variable compliance joystick 200 described above may be mechanically configurable and include variable compliance to full isometric to be adapted for best use by a user, and/or include dampening to reduce effects of unwanted motion. As discussed above for joystick 100, joystick 200 may incorporate compensation algorithms, including a dead-zone for determining an elliptical area where joystick 200 ignores input, and filtering to reduce effects of tremors and other spurious motions. Moreover, the axes of motion need not be orthogonal, thus enabling the finding of the best directions for forward, reverse, left and right directions. Joystick 200 may also include software templates of various shapes generated with a single parameter. Joystick 200 may be used with the wheelchair simulator discussed above for facilitating the matching of joystick mechanical and software parameters to individual users.

Joystick 200 is further beneficial in that virtually all bending takes place at the center of flexible extension 250, and the center of extension 250 is consistently maintained at the mechanical center (i.e. the intersection) of the gimbal axis X. It should be noted that while an index bushing 216 including internal/external threads is illustrated in operative engagement with threaded stud 248 and column 242, any mechanism may be employed so as to change the length of flexible extension 250 while simultaneously longitudinally displacing extension 250 so that the center of the altered extension length remains centered with the intersection of the gimbal axis X. Such mechanisms may include a variety of gear/worm arrangements, or other automatic means for displacing extension 250 and column 242. The present invention thus provides a mechanical means of adjusting extension 250 with concurrent realignment to provide a continuous range of elastic compliance while maintaining a balanced buckling extension.

One of ordinary skill in the art will appreciate in view of this disclosure that the wheelchair simulator disclosed herein may have application to other vehicles, such as cars, scooters, remotely controlled vehicles and for robotics. As evident for joystick 100, joystick 200 may likewise be used for wheelchair control, as discussed above, or for control of other applications such as for computer pointing application (mouse). Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

TABLE 1

Dead Zone Algorithm

| Symbol | Definition |
|---|---|
| DZ | Dead Zone |
| fy | Force in the Y direction |
| fx | Force in the X direction |
| a | Regression parameter derived for subject along X-axis |
| b | Regression parameter derived for subject along X-axis |
| r | Virtual radius |
| k | Count 1, 2, 3, 4 . . . N |
| T | Sampling rate |

TABLE 2

Filter Frequency Algorithm

| Symbol | Definition |
|---|---|
| Hz | Frequency in Hertz |
| Fx | Force amplitude in the frequency domain |
| Fy | Force amplitude in the frequency domain |
| $F_{stop_x}$ | Conditions when data was collected - X-axis |
| $F_{forward_x}$ | |
| $F_{reverse_x}$ | |
| $F_{left_x}$ | |
| $F_{right_x}$ | |
| $F_{stop_y}$ | Conditions when data was collected - Y-axis |
| $F_{forward_y}$ | |
| $F_{reverse_y}$ | |
| $F_{left_y}$ | |
| $F_{right_y}$ | |

TABLE 3

Bias Axis Algorithm

| Symbol | Definition |
|---|---|
| $\hat{f}_y$ | Regression line for $F_y$ on Y-axis |
| $\hat{f}_x$ | Regression line for $F_x$ on X-axis |
| $m_{straight}$ | Regression constant for straight test |
| $m_{turn}$ | Regression constant for turn test |
| C | Result of the dot product of the skewed axes |
| $\dfrac{\hat{f}_x(k\Delta T)}{\|\hat{f}_x(k\Delta T)\|}$ | Unit vector along skewed X-axis |
| $\dfrac{\hat{f}_y(k\Delta T)}{\|\hat{f}_y(k\Delta T)\|}$ | Unit vector along skewed Y axis |

TABLE 4

Gain Algorithm

| Symbol | Definition |
|---|---|
| $f_{x_{comfort}}$ | User specific level of comfortable effort X-axis |
| $f_{y_{comfort}}$ | User specific level of comfortable effort Y-axis |

TABLE 4-continued

Gain Algorithm

| Symbol | Definition |
|---|---|
| $Range_{x_{controller\_input}}$ | Range of signal the A/D accepts on X-axis |
| $Range_{y_{controller\_input}}$ | Range of signal the A/D accepts on Y axis |
| $f_{x_{dead-zone}}$ | Maximum of the X-axis dead zone |
| $f_{y_{dead-zone}}$ | Maximum of the Y-axis dead zone |

What is claimed is:

1. A joystick apparatus comprising:
a joystick shaft having a predetermined length, and including upper and lower joystick segments operatively connected to each other, said lower joystick segment being substantially flexible and movable relative to said upper joystick segment to vary compliance of said joystick shaft without substantially changing said predetermined length.

2. A joystick according to claim 1, wherein said upper joystick segment having a longitudinal axis, said joystick further comprising a gimbal assembly substantially surrounding a length of said lower joystick segment for generally maintaining said lower joystick segment in a predetermined extended orientation relative to said longitudinal axis.

3. A joystick according to claim 1, wherein said upper joystick segment includes a handle mounted to an index bushing including internal threads along a length thereof, a drive stud operatively connected to said lower joystick segment and further including external threads operatively engaged with said internal threads such that rotation of said handle in first and second opposite rotational directions respectively moves said lower joystick segment toward and away from said upper joystick segment to vary the compliance of said shaft.

4. A joystick according to claim 1, wherein said upper joystick segment includes a handle mounted to an index bushing including external threads along a length thereof, a chamber column including internal threads operatively engaged with said external threads such that rotation of said handle in first and second opposite rotational directions respectively moves said chamber column away from and toward said upper joystick segment to vary the compliance of said shaft by reducing a bendable length of said lower joystick segment.

5. A joystick according to claim 1, wherein said upper joystick segment includes a handle mounted to an index bushing including internal and external threads along a length thereof, a drive stud operatively connected to said lower joystick segment and further including external threads operatively engaged with said index bushing internal threads, and a chamber column including internal threads operatively engaged with said index bushing external threads, such that rotation of said handle in first and second opposite rotational directions respectively moves said lower joystick segment toward and away from said upper joystick segment, and further respectively moves said chamber column away from and toward said upper joystick segment to vary the compliance of said shaft by reducing a bendable length of said lower joystick segment.

6. A joystick according to claim 5, further comprising a spring biased locking plunger selectively engageable with said index bushing for allowing and preventing rotation of said index bushing when respectively disengaged from and engaged with said index bushing.

7. A joystick according to claim 1, wherein said upper joystick segment includes index bushing means operatively connected to drive stud means such that rotation of a handle of said upper joystick segment in first and second opposite rotational directions respectively moves said lower joystick segment toward and away from said upper joystick segment to vary the compliance of said shaft.

8. A joystick according to claim 1, wherein said upper joystick segment includes index bushing means operatively connected to chamber column means such that rotation of a handle of said upper joystick segment in first and second opposite rotational directions respectively moves said chamber column means away from and toward said upper joystick segment to vary the compliance of said shaft by reducing a bendable length of said lower joystick segment.

9. A joystick according to claim 2, wherein said gimbal assembly includes a gimbal ring operatively connected to said upper joystick segment, said gimbal ring having said lower joystick segment disposed therethrough, said gimbal assembly further being disposed within an enclosure for limiting pivotal movement of said joystick shaft by substantially enclosing said upper joystick segment within an opening in said enclosure.

10. A joystick according to claim 9, wherein said gimbal ring being pivotally mounted within said enclosure for pivotal movement about a first axis of rotation, said upper joystick segment being pivotally mounted to said gimbal ring by at least two yoke legs for rotation about a second axis of rotation substantially orthogonal to said first axis of rotation for thereby enabling substantially universal pivotal movement of said upper joystick segment relative to said lower joystick segment.

11. A joystick according to claim 1, wherein said lower joystick segment being slidably connected to an isometric post, for controlling said joystick, by a sleeve fixedly mounted to said lower joystick segment and further slidably disposed around said isometric post.

12. A joystick according to claim 1, wherein said joystick includes integrated control capability for operating multiple assistive devices.

13. A joystick according to claim 1, wherein said joystick is operatively mounted on an electric powered wheelchair for allowing a user to operate multiple assistive devices.

14. A joystick according to claim 1, further comprising compensation algorithms including an elliptical dead-zone representative of said joystick shaft at rest, said dead-zone representing a minimum range of forces which must be exceeded to produce motion of an electric powered wheelchair including the joystick mounted thereon, said dead-zone further representing a maximum range of forces which must not be exceeded to prevent movement of the wheelchair.

15. A joystick according to claim 1, further comprising compensation algorithms including a determination of an optimal bias axes gain for movement of said joystick shaft in left, right, forward and backward directions.

16. A joystick according to claim 1, further comprising compensation algorithms including at least one software template for at least one of controlling bias of said joystick shaft, decreasing throw of said joystick shaft and reducing degrees of freedom of an output signal of said joystick shaft.

17. A joystick according to claim 16, wherein said software template is based upon the mathematics of super quadratics.

18. A joystick according to claim 17, wherein said software template is one of a square, circular, cross, elliptical and diamond shaped template.

19. A joystick according to claim 1, further comprising compensation algorithms including filtering to reduce the effects of unwanted motions of said joystick shaft.

20. A joystick according to claim 1, wherein said upper joystick segment is detachable from said lower joystick segment for facilitating replacement of said lower joystick segment.

* * * * *